(12) United States Patent
Guillou et al.

(10) Patent No.: US 7,570,825 B2
(45) Date of Patent: Aug. 4, 2009

(54) METHOD AND DEVICE FOR DETERMINING A DATA CONFIGURATION OF A DIGITAL SIGNAL OF AN IMAGE

(75) Inventors: Jeanne Guillou, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 10/732,484

(22) Filed: Dec. 11, 2003

(65) Prior Publication Data

US 2004/0165779 A1  Aug. 26, 2004

(30) Foreign Application Priority Data

Dec. 11, 2002  (FR) .................................. 02 15644

(51) Int. Cl.
G06K 9/36 (2006.01)
G06K 9/46 (2006.01)

(52) U.S. Cl. ........................ 382/240; 382/166; 382/248

(58) Field of Classification Search ................. 382/166, 382/240, 248, 251; 348/395.1, 403.1, 408.1; 375/240.18, 240.19, 240.24
See application file for complete search history.

(56) References Cited

U.S. PATENT DOCUMENTS

| | | | | |
|---|---|---|---|---|
| 5,349,348 A | * | 9/1994 | Anderson et al. | 341/51 |
| 5,416,604 A | * | 5/1995 | Park | 382/232 |
| 5,481,309 A | * | 1/1996 | Juri et al. | 375/240.03 |
| 5,799,111 A | * | 8/1998 | Guissin | 382/254 |
| 6,757,439 B2 | * | 6/2004 | Leeder et al. | 382/246 |
| 2002/0064232 A1 | | 5/2002 | Fukuhara et al. | 375/240.26 |
| 2002/0097411 A1 | | 7/2002 | Roche et al. | 358/1.9 |
| 2002/0109863 A1 | * | 8/2002 | Monroe | 358/400 |
| 2003/0035478 A1 | * | 2/2003 | Taubman | 375/240.11 |
| 2003/0165273 A1 | * | 9/2003 | Berkner et al. | 382/240 |

FOREIGN PATENT DOCUMENTS

| | | |
|---|---|---|
| EP | 1 158 764 A2 | 11/2001 |
| FR | 2 817 437 | 5/2002 |

OTHER PUBLICATIONS

Taubman, D., "High Performance Scalable Image Compression with EBCOT," IEEE Transactions on Image Processing, vol. 9, No. 7, Jul. 2000, pp. 1158-1170, XP-000951990.

(Continued)

*Primary Examiner*—Yubin Hung
(74) *Attorney, Agent, or Firm*—Fitzpatrick, Cella, Harper & Scinto

(57) ABSTRACT

A method relates to the of determining a data configuration of a digital signal of an image, the signal having undergone at least one spatio-frequential transformation in at least one resolution level. The method includes determining and configuring steps. The determining step determines at least one minimum rate reduction ($D_{min}$) as a proportion of the total data rate of at least one resolution level of the signal, as a function of a quality mode desired for the signal. The configuring step configures the data of the signal in at least one quality layer defined for at least one resolution level of the signal such that the at least one quality layer so defined corresponds to a given visual quality of the signal, the data making up that at least one quality layer being obtained by a reduction (D) of the total rate of the data of the at least one resolution level of the signal which is greater than or equal to the minimum reduction ($D_{min}$).

14 Claims, 15 Drawing Sheets

OTHER PUBLICATIONS

Jafarkhani, H., et al., "Adaptive Image Coding Based on the Discrete Wavelet Transform," Proceedings of the Intl. Conference on Image Processing (ICIP), Austin, Nov. 13-16, 1994, IEEE Comp. Soc. Press, US, vol. 3, conf. 1, Nov. 13, 1994, pp. 343-347, XP-000522829.

Boliek, M., editor, "JPEG 2000 Part I Final Committee Draft Version 1.0", ISO/IEC JTC1/SC29/WG1 N1646, Mar. 16, 2000, pp. A, B, I-XII, 1-190, XP001004858.

Taubman, D., "JPEG2000 Verification Model VM3A, ISO/IEC JTC1/SC29/WG1 N1143", ISO/IEC JTC1/SC29/WG1 N1143, Feb. 1, 1999, pp. 1-90, XP002146099.

In, J., et al., "JPEG Compliant Efficient Progressive Image Coding" Acoustics, Speech and Signal Processing, 1998, Proceedings of the 1998 IEEE Intl. Conference on Seattle, WA, USA May 12-15, 1998, pp. 2633-2636, XP010279384.

Deshpande, et al., HTTP Streaming of JPEG2000 Images, Proc. Intl. Conf. On Info. Tech.: Coding and Computing, IEEE (Apr. 2, 2001), pp. 15-19, XP002193324.

INPI, Rapport De Recherche Preliminaire, FR 0215644 (Oct. 17, 2003).

* cited by examiner

Deletion of a resolution
(at the decoder)

Deletion of a resolution
(at the decoder)

METHOD AND DEVICE FOR DETERMINING A DATA CONFIGURATION OF A DIGITAL SIGNAL OF AN IMAGE

FIELD OF THE INVENTION

The invention relates to a method and a device for determining a data configuration of a digital signal of an image conveying a total data rate $D_t$.

BACKGROUND OF THE INVENTION

Currently, it is known that digital cameras provide a plurality of compression modes for image signals in accordance with the JPEG standard each of which corresponds to a given image quality mode.

For example, in its digital cameras the Canon corporation provides the quality modes termed "Super Fine", "Fine" and "Normal" which are characterized by quantization tables used in encoding. Thus, the values of the quantization tables used for the "Normal" mode are higher than for the other modes and result in an approximation of an image which is less fine, but also with a higher level of compression.

These quantization tables are comparable to the default tables defined in the JPEG standard with respective quality parameters of 97, 93 and 73.

Thus the use of such encoding parameters makes it possible to obtain quantization tables which characterize quality modes similar to the aforementioned modes.

According to the JPEG standard, the desired quality mode is chosen definitively before the encoding of the image signal and it is not possible later to pass to another quality mode for the encoded image signal.

A rate/distortion allocation method is known which makes it possible to obtain an image signal in accordance with the JPEG2000 standard and which enables quality layers to be constructed corresponding to a target rate solely for the maximum resolution.

The objective of the rate/distortion allocation method commonly used in implementations of the JPEG2000 standard is to obtain a target rate while minimizing the distortion of an image. That method relies on an algorithm which is described in the article entitled "High performance scalable image compression with EBCOT" by D. Taubman, which appeared in "IEEE Transactions on image processing", Vol. 9, No. 7, July 2000, pages 1158 to 1170.

For each block of coefficients $B_i$ of the image signal decomposed into frequency sub-bands at a plurality of resolution levels, it is possible to determine a plurality of truncation points $R_i^n$ of the bitstream of the block $B_i$ corresponding respectively to a distortion $D_i^n$. The objective of this method is to optimize the points $(R_i^n, D_i^n)$ in order to minimize the total distortion $$D = \sum_i D_i^{n_i}$$

of the image with a rate constraint $$R = \sum_i R_i^{n_i} \leq R_{max},$$

$n_i$ being the truncation point selected for the block i. This amounts to finding the smallest value of $\lambda$ such that $R(\lambda) \leq R^{max}$ and which minimizes the equation $$(D(\lambda) + \lambda R(\lambda)) = \sum_i (D_i^{n_i} + \lambda R_i^{n_i}).$$

For this, the following steps may be taken:
Initialization of the extreme values $\lambda_{min}$ and $\lambda_{max}$,
Setting a value $\lambda$ equal to $$\frac{\lambda_{min} + \lambda_{max}}{2},$$

Determining, for that value $\lambda$, the truncation points for all the blocks $B_i$ which minimize the equation $$(D(\lambda) + \lambda R(\lambda)) = \sum_i (D_i^{n_i} + \lambda R_i^{n_i}),$$

If $R(\lambda) > R^{max}$, setting $\lambda_{min} = \lambda$, otherwise setting $\lambda_{max} = \lambda$ and looping back to the second step.

For each value of $\lambda$ tested, the calculations must thus be redone considering all the blocks of the image, which may prove costly in terms of calculations and thus in execution time.

Furthermore, the rate allocation is calculated solely for the maximum resolution level in the image signal.

From the document EP 1 158 764 A2 there is also known a method of encoding an image signal in accordance with the JPEG 2000 standard and an associated method of analyzing these images in order to free up memory.

The encoding method makes it possible to obtain a JPEG2000 file structure with multiple quality layers for each resolution. Before deleting data in order to free up memory, a method of analyzing and calculating is necessary in order to determine how many quality layers will be deleted to obtain the desired rate reduction.

It should be noted that these steps of analyzing and calculating the data are repeated each time it is desired to free up memory, which proves to be disadvantageous.

BRIEF SUMMARY OF THE INVENTION

The object of the present invention is to remedy at least one of the aforementioned drawbacks by providing a method of determining a data configuration of a digital signal of an image, the signal having undergone at least one spatio-temporal transformation in at least one resolution level, characterized in that the method includes the following steps:

determining at least one minimum rate reduction $D_{min}$ with respect to the total data rate of at least one resolution level of the signal, as a function of a quality mode desired for the signal, configuring the data of the signal in at least one quality layer defined for at least one resolution level of the signal such that each quality layer so defined corresponds to a given visual quality of the signal, the data making up that at least one quality layer being obtained by a reduction D in the total rate of the data of said at least one resolution level of the signal which is greater than or equal to the minimum reduction $D_{min}$.

In a complementary manner, the invention also relates to a device for determining a data configuration of a digital signal of an image, the signal having undergone at least one spatio-temporal transformation in at least one resolution level, characterized in that the device includes:

a unit determining at least one minimum rate reduction $D_{min}$ with respect to the total data rate of at least one resolution level of the signal, as a function of a quality mode desired for the signal, and a unit configuring the data of the signal in at least one quality layer defined for at least one resolution level of the signal such that said at least one quality layer so defined corresponds to a given visual quality of the signal, the data making up that at least one quality layer being obtained by a reduction D of the total rate of the data of said at least one resolution level of the signal which is greater than or equal to the minimum reduction $D_{min}$.

So configured, the image signal may be transmitted as it is to a communication apparatus where a user receiving that signal may, if so desired, delete the data of the signal so enabling him to keep only data of interest, i.e. those data making up the quality layer or layers defined previously for one or more resolution levels.

A signal will thus be obtained which is configured to the desired quality mode, to the desired resolution, and with a given visual quality, which was not possible with the prior art.

The user may even delete one or more quality layers of the configured signal to keep only the one or ones of interest.

It should be noted that if a quality layer is defined for a resolution other than the maximum resolution, the determination of the reduction in rate is performed with respect to the total data rate for that other resolution.

Moreover, if a plurality of quality layers are defined, a plurality of corresponding determinations of minimum rate reduction will be necessary.

Before transmitting the signal having the desired configuration it may also be envisaged to delete the above-mentioned data from that signal.

That converted signal may then be transmitted or not to a remote communication apparatus.

It is also possible for the method according to the invention to be performed in a communication apparatus where intervention by a user is involved.

Furthermore, the invention does not require complex calculations which give rise to a long time for execution, by contrast to the prior art.

This is advantageous when the equipment in which the signal is configured has a relatively reduced computational capacity.

In addition, when the signal is configured in accordance with the invention, that is to say when one or more quality layers corresponding to a given visual quality has been created, it is not necessary thereafter to carry out calculations on the data of the signal in order to know which are to be deleted in order to free up memory space.

This is because the quality layer or layers has been expressly created in order to give the user the possibility later of converting an image signal from one given quality mode to a lower quality mode without additional calculation.

The configuration of the data of the signal according to the invention may give rise to the creation of a single quality layer for a single resolution level, or to a quality layer per resolution level concerned for a plurality of resolution levels, or even for each resolution level of the signal.

Thus the reduction in rate making it possible to obtain the quality mode desired while preserving a given visual quality may be seen as the deletion of data corresponding to a quality level hierarchically above to attain the quality level created hierarchically below.

According to the invention it is also possible to consider that a plurality of hierarchical quality layers are created for a single resolution level or a plurality of layers per resolution level for a plurality of resolution levels, each quality layer corresponding to a given visual quality.

The deletion, for example, of a quality level hierarchically above is accompanied by a reduction in the rate at least equal to a minimum value and thus makes it possible to obtain the desired quality mode with the guarantee of a given visual quality.

According to one feature, the signal issuing from the at least one spatio-temporal transformation includes blocks each containing at least one transformed coefficient having the form of a series of binary elements, the data making up a quality layer which is defined in at least one resolution level of the signal, corresponding, for at least one block of a given resolution level, to at least a number n of portions of binary elements of said at least one block.

The number n obtained thus makes it possible to ensure the removal of visual artifacts in the image signal.

According to another feature, said at least one number n of portions of binary elements is determined as a function of a given number N which corresponds to the maximum number of portions of binary elements which it is possible to delete in a block to obtain a given visual quality in the resolution considered.

The threshold N thus makes it possible to ensure that by creating a quality layer in a given resolution level of the signal, that signal does not risk having its visual quality degraded by the deletion of corresponding data.

According to another feature, the method includes a step of classifying the data blocks as a function of the values of the distortion which is generated for each block when the maximum given number N of portions of binary elements is deleted from each block.

According to another feature, the data blocks are classified into different classes of blocks to each of which the data blocks having given rise to values of distortion which are consistent with each other belong.

Each of these classes has statistical properties which are equivalent in terms of the ratio standard deviation/mean.

The classification of the blocks into different classes as a function of the distortion values makes it possible to adapt, for each block, the number of portions of binary elements to delete with respect to the aforementioned maximum level N as a function of the classification of that block.

Thus, within the same resolution level, it is possible to distribute the reduction in rate taking into account the classification of the blocks and, for example, to decide to delete more binary portions for certain blocks than for others.

It is for example preferable to delete more portions of binary elements for a block put in a class in which the distortion generated is the least.

Conversely, for the blocks generating greater distortion, a smaller number of portions of binary elements will be deleted for the blocks of that class.

According to one feature, the signal issuing from the at least one spatio-temporal transformation includes transformed coefficients grouped into blocks in which each coefficient is quantized over a plurality of bits, each bitplane of a block being encoded by a plurality of encoding passes which each provides a portion of the encoding data for the block considered, configuring the data of the signal in at least one quality layer including obtaining, in at least one resolution level of the signal and for each of the blocks considered, a minimum number m of encoding passes corresponding to the given visual quality.

According to another feature, the minimum number m is obtained as a function of a maximum given number N of encoding passes which it is possible to delete for the coefficients of a data block in order to obtain a given visual quality in the resolution considered.

According to another feature, the invention relates to a method of determining a data configuration of a digital signal of an image, the signal having undergone at least one spatio-temporal transformation in at least one resolution level, characterized in that the method includes the following steps:

determining at least one minimum rate reduction $D_{min}$ with respect to the total data rate of at least one resolution level of the signal, as a function of a quality mode desired for the signal, distributing, over at least certain of the resolution levels of the signal, a rate reduction D greater than or equal to $D_{min}$ which is such that the reduction in data rate distributed in each resolution level is less than or equal to a threshold representing a given visual quality.

In a complementary manner, the invention also relates to a device for determining a data configuration of a digital signal of an image, the signal having undergone at least one spatio-temporal transformation in at least one resolution level, characterized in that the device includes:

a unit determining at least one minimum rate reduction $D_{min}$ with respect to the total data rate of at least one resolution level of the signal, as a function of a quality mode desired for the signal, and a unit distributing, over at least certain of the resolution levels of the signal, a rate reduction D greater than or equal to $D_{min}$ which is such that the reduction in data rate distributed in each resolution level is less than or equal to a threshold representing a given visual quality.

According to this feature, as a function of the quality mode for a given resolution level which it is desired to propose to the user and thus of a minimum reduction in data rate, the reduction in rate enabling that quality mode to be obtained will be distributed in different resolution levels, while ensuring that the given visual quality in the given resolution level is not affected.

The distribution of the rate reduction will be made by deleting, for a given quality layer, encoding passes in the different aforementioned resolution levels, thus achieving a configuration of the data of the signal.

According to still another feature, the invention relates to a method of determining a data configuration of a digital signal of an image, the signal having undergone at least one spatio-temporal transformation in at least one resolution level, thus providing transformed coefficients each taking the form of a series of binary elements comprising a plurality of portions, characterized in that the method includes the following steps:

i) determining at least one minimum rate reduction $D_{min}$ with respect to the total data rate of at least one resolution level of the signal, as a function of a quality mode desired for the signal, ii) determining, for a given resolution level $R=R_i$ and for at least certain transformed coefficients of that level, a number m which may vary from one coefficient to another, of portions of binary elements to delete from the signal, with $m \leq N$, where N is a maximum given number which guarantees a given visual quality in the resolution level considered, iii) determining the reduction in rate $D_i$ generated by the deletion in the resolution level R of the m portions of binary elements of the at least certain transformed coefficients, iv) comparing the rate reduction added to the possible rate reduction determined for the resolution level hierarchically above with respect to the minimum rate reduction $D_{min}$, v) as a function of the result of the comparison, deciding as to the reiteration of steps ii) to v) for the resolution level R or for the resolution level below R $R_{i-1}$ or as to the determined data configuration.

In a complementary manner, the invention relates to a device for determining a data configuration of a digital signal of an image, the signal having undergone at least one spatio-temporal transformation in at least one resolution level, thus providing transformed coefficients each taking the form of a series of binary elements including a plurality of portions, characterized in that the device includes:

a unit determining at least one minimum rate reduction $D_{min}$ with respect to the total rate of data of at least one resolution level of the signal, as a function of a quality mode desired for the signal, a unit determining, for a given resolution level $R=R_i$ and for at least certain transformed coefficients of that level, a number m, which may vary from one coefficient to another, of portions of binary elements to delete from the signal, with $m \leq N$, where N is a maximum given number which guarantees a given visual quality in the resolution level considered, a unit determining the reduction in rate $D_i$ generated by the deletion in the resolution level R of the m portions of binary elements of said at least certain transformed coefficients, a unit comparing the rate reduction added to the possible rate reduction determined for the resolution level hierarchically above with respect to the minimum rate reduction $D_{min}$, and a unit deciding as to the determined configuration of the data, as a function of the result of the comparison.

The invention thus proceeds iteratively commencing with the upper resolution levels and, at each resolution level, by searching for the number of portions of binary elements which can be deleted from the quality layer being processed in order to obtain a sufficient rate reduction, while ensuring that this number is always less than or equal to a threshold.

This threshold guarantees a given visual quality and is there to ensure that the deletion of a quantity of data from the signal in a given resolution level does not risk giving rise to a degradation in the visual quality of the signal obtained further to the deletion.

For a resolution level, once a number of portions of binary elements to delete has been found which respects the given visual quality criterion and which gives rise to a sufficient reduction in rate, the configuration of the signal is determined for that resolution level.

It will be noted that the determination of a data configuration of a digital signal according to the invention makes it possible in a way to structure the signal into portions of data which are defined in such a manner as to satisfy a given visual quality criterion.

The signal so configured in accordance with the invention has a hierarchical structure of the data in terms of quality corresponding to those portions of data.

It will be noted that the given visual quality corresponds to a visual quality of a non-degraded image signal, that is to say to an image signal having no visible artifacts.

According to a supplementary feature, the invention relates to a method of determining a data configuration of a digital signal of an image, the signal having undergone at least one spatio-temporal transformation in at least one resolution level, thus providing transformed coefficients each taking the form of a series of binary elements including a plurality of portions, characterized in that the method includes the following steps:

i) determining at least one minimum rate reduction $D_{min}$ with respect to the total rate of at least one given display resolution level $R_a$ as a function of a quality mode desired for the signal, ii) determining, for a resolution level $R_i$ which corresponds initially to $R_a$ and for at least certain transformed coefficients of that level, a number m, which may vary from one coefficient to another, of portions of binary elements to delete from the signal, with m≦N, where N is a maximum given number which guarantees a given visual quality in the resolution level considered, iii) determining the reduction in rate $D_i$ generated by the deletion in the resolution level $R_i$ of the m portions of binary elements of said at least certain transformed coefficients, iv) comparing the reduction in rate with respect to the minimum rate reduction $D_{min}$, and v) as a function of the result of the comparison, deciding as to the reiteration of steps ii) to v) for the resolution level $R_i$ or for the resolution level hierarchically below $R_i=R_{i-1}$ or as to the reiteration of steps i) to v) for the level of display resolution hierarchically below $R_a=R_a-1$ or as to the determined data configuration.

In a complementary manner, the invention relates to a device for determining a data configuration of a digital signal of an image, the signal having undergone at least one spatio-temporal transformation in at least one resolution level, thus providing transformed coefficients each taking the form of a series of binary elements including a plurality of portions, characterized in that the device includes:

a unit determining at least one minimum rate reduction $D_{min}$ with respect to the total rate of at least one given display resolution level $R_a=R_i$ as a function of a quality mode desired for the signal, a unit determining, for a resolution level $R_i$ which corresponds initially to $R_a$ and for at least certain transformed coefficients of that level, a number m which may vary from one coefficient to another, of portions of binary elements to delete from the signal, with m≦N, where N is a maximum given number which guarantees a given visual quality in the resolution level considered, a unit determining the reduction in rate $D_i$ generated by the deletion in the resolution level $R_i$ of the m portions of binary elements of said at least certain transformed coefficients, a unit comparing the reduction in rate with respect to the minimum rate reduction $D_{min}$, and a unit deciding as to the configuration of the data, as a function of the result of the comparison.

According to this feature, a minimum reduction in rate is determined with respect to the total data rate of the current resolution level and not solely with respect to the total data rate of the maximum resolution level.

Thus a data configuration is defined corresponding to the given quality mode in the current resolution level and in all the resolution levels below.

In this manner, it is ensured that in each of those resolution levels, the quality layer created satisfies the given quality mode.

The invention also concerns a digital camera including a device as briefly disclosed above.

According to another aspect, the invention also relates to:

an information storage means which can be read by a computer or a microprocessor comprising code instructions' for a computer program for executing the steps of the method according to the invention as for the one briefly set out above, and a partially or totally removable information storage means which can be read by a computer or a microprocessor containing code instructions of a computer program for executing the steps of the method according to the invention as for the one briefly disclosed above.

According to yet another aspect, the invention relates to a computer program which can be loaded into a programmable apparatus, containing sequences of instructions or portions of software code for implementing the steps of the method according to the invention as briefly disclosed above, when the computer program is loaded and executed on the programmable apparatus.

As the features and advantages relating to the device, to the digital camera comprising such a device, to the information storage means and to the computer program are the same as those disclosed above concerning the method according to the invention, they will not be repeated here.

Other features and advantages of the present invention will emerge more clearly from a reading of the following description, given with reference to the accompanying drawings, in which:

BRIEF DESCRIPTION OF THE DRAWINGS

FIG. 6b is a flow chart detailing the operations carried out at step S220 of the algorithm of FIG. 6a;

DETAILED DESCRIPTION

Figure 1:
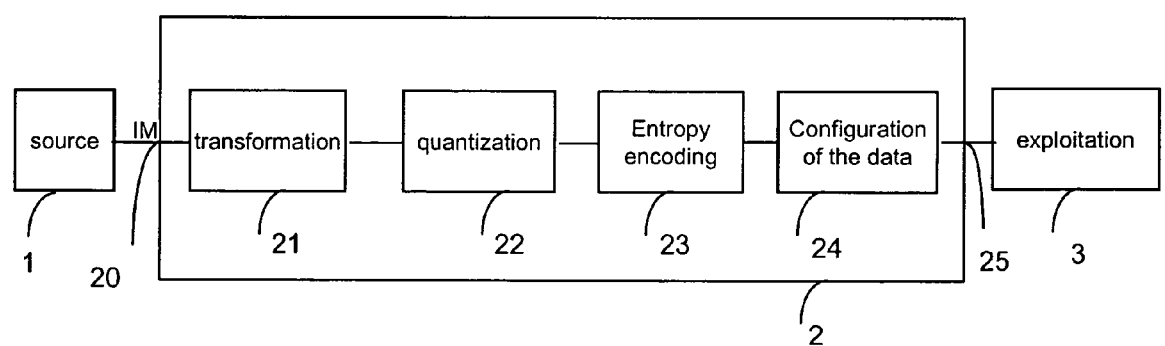
FIG. 1 is a diagram of a system for encoding a digital signal of an image in which the invention is implemented.

According to a chosen embodiment shown in FIG. 1, a system for encoding or compressing data is a system which includes an input 20 to which a source 1 of non-encoded data is connected.

The source 1 includes for example, a memory unit, such as a random access memory, a hard disk, a diskette or a compact disc, for storing non-encoded data, this memory unit being associated with a suitable reading unit for reading the data therein. A unit for recording the data in the memory means can also be provided.

It will be considered more particularly hereinafter that the data to be encoded are a series of original digital samples representing physical quantities and representing, for example, an image IM.

The source 1 supplies a digital image signal IM to the input of the encoding circuit 2. The image signal IM is a series of digital words, for example, bytes. Each byte value represents a pixel of the image IM, here with 256 levels of gray, or black and white image. The image can be a multispectral image, for example a color image having components in three frequency bands, of the red-green-blue or luminance and chrominance type. Either the color image is processed in its entirety, or each component is processed in a similar manner to the monospectral image.

It will also be noted that the image may be a fixed image (e.g. a photograph) or an image from a video sequence.

Unit 3 for exploiting encoded or compressed data is connected at the output 25 of the encoding system 2.

The using unit 3 includes, for example, a unit for storing encoded data, and/or means of transmitting encoded data.

The encoding system 2 conventionally includes, starting from the input 20, a spatio-temporal transformation unit 21 which may perform one or more spatio-temporal transformations. For example, the circuit 21 may perform decompositions into frequency sub-band signals of the data signal, so as to carry out an analysis of that signal.

The transformation circuit 21 may possibly be connected to a quantization circuit 22. The quantization circuit performs a quantization which is known per se, for example, a scalar quantization, or a vector quantization, of the coefficients, or groups of coefficients, of the frequency sub-band signals supplied by the circuit 21.

The circuit 22 is connected to an entropy encoding circuit 23, which performs an entropy encoding, for example a Huffman encoding, or an arithmetic encoding, of the data quantized by the circuit 22.

Circuit 23 is connected to a device 24 which configures the data, for example quantized, of the transformed signal in order to create in the signal one or more quality layers for one or more resolution levels (if the signal has a plurality of resolution levels).

The quality layer or layers are created while ensuring that each quality layer created gives a specific visual quality.

This visual quality may be set in advance, for example, empirically on the basis of a number of images of different nature which are sufficiently homogeneous to be representative of the images which it is possible to encounter in practice. This visual quality may also take into account the signal considered.

Each quality layer corresponds to supplementary data which permit a finer approximation of the signal. It may be decided to delete the higher quality layers in order to reduce the rate of the signal and thus, on later decoding, a less fine reconstitution of the signal will be achieved.

That quality layer or layers are thus determined in order for the reduction in rate considered from the total rate of data conveyed by the original signal or by a lower resolution level to be sufficient taking into account the quality mode which it is desired to provide the to user.

In the description which follows, three quality modes will be considered that are defined by the JPEG standard and, more particularly, that are characterized by default quantization tables defined in that standard with a respective quality parameter of 97, 93 and 73.

These quantization tables are comparable to those defining the quality modes "Super Fine", "Fine", and "Normal" of the cameras of the Canon corporation and thus define quality modes similar to those of the aforementioned cameras.

In the following description, the quality modes defined by the JPEG standard will, by analogy, be termed "Super Fine", "Fine" and "Normal", even though they are not strictly identical to the quality modes of the same name of the Canon cameras.

Generally, a minimum rate reduction $D_{min}$ is fixed as a function of the total rate of the given resolution and of the quality mode to be provided to the user.

In this manner, it is ensured that when a quality layer is configured in the signal, it will provide a visual quality which is satisfactory for one or more given criteria when the signal is reduced to that quality layer considered in the resolution.

It should be noted that a quality layer is constructed for a given resolution.

If it is desired that the quality mode be available in the lower resolutions, a quality layer must be constructed per resolution concerned, by calculating the reduction in rate with respect to the total rate for the resolution concerned and not for the entire signal.

Furthermore, as that layer will be created so as to correspond to a satisfactory reduction in rate D ($D \geq D_{min}$) it will thus be ensured that the desired quality mode will be obtained.

It should be noted that it is possible, for a given resolution of the signal, just to create a quality layer while ensuring only that it corresponds to a satisfactory reduction in rate D, without bothering about the visual quality obtained for the quality layer so created.

In that case, it is very probable that when the signal will later be reduced to that quality layer in that resolution, the visual quality of the image obtained will be very degraded.

The invention makes it possible to avoid such an occurrence.

It should be noted that the signal configured according to the invention and encoded may be exploited by the user who can then decide to convert the original quality mode of that signal into a lower quality mode given the quality layer or layers created by the device 24, by deleting one or more higher quality layers. The user could also delete one or more resolution levels of the signal if desired.

Both conversions can be contemplated whether separately or in combination.

Moreover, it may be contemplated that the signal be converted before being transmitted to a remote user.

According to another approach, the configured and encoded signal may be transmitted to a remote user who will then convert it, for example, as indicated above.

Figure 2:
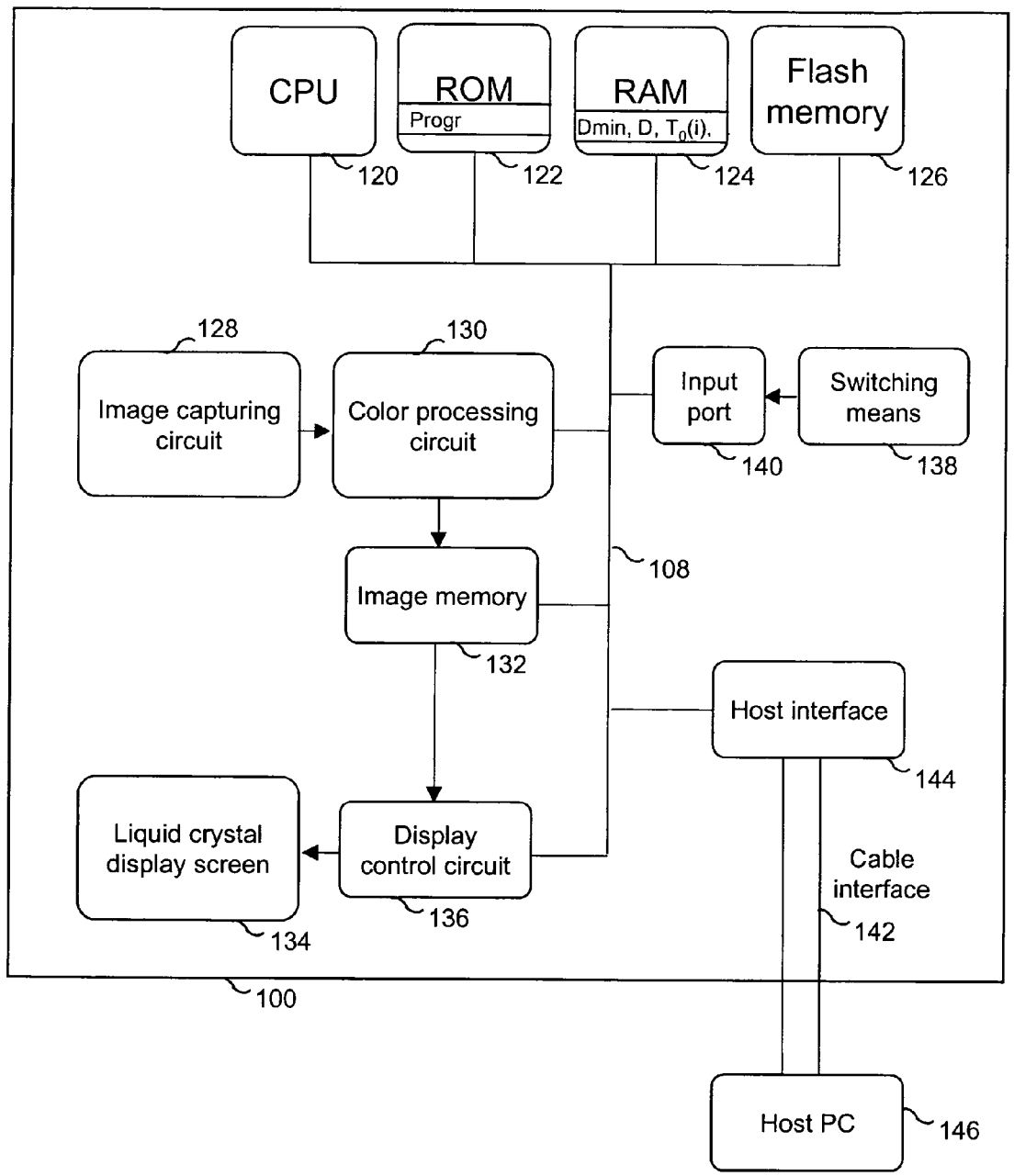
FIG. 2 is a diagram of a programmable apparatus implementing the invention.

With reference to FIG. 2, an example of a programmable apparatus 100 implementing the invention is described. That apparatus is adapted to configure the data of a digital signal of an image stored in the apparatus or in another communication apparatus.

The communication apparatus of FIG. 2 includes a device according to the invention, that is to say it possesses all the means necessary for the implementation of the different features of the invention (means for determining a minimum rate reduction, means for configuring the data, means for distributing a rate reduction, means for determining a number m, means for determining the rate reduction generated, means for comparing, means for deciding), or itself constitutes such a device according to the invention.

The apparatus of FIG. 2 may thus comprise the encoding system 2 of FIG. 1 including the device 24, or just the device 24.

According to the embodiment represented in FIG. 2, an apparatus implementing the invention is, for example, a digital camera 100 connected to different peripherals, for example, a means for image acquisition or storage.

The apparatus 100 of FIG. 2 has a communication bus 108 to which are connected:

a central processing unit 120 (microprocessor), a read-only memory 122, comprising a program "Progr" enabling the programmable apparatus to implement the invention (although a single program is identified, it is possible to have a plurality of programs or subprograms to implement the invention), a random access memory 124, comprising registers adapted to record variables modified during the execution of the aforementioned program, a Flash (card) memory 126 for storing encoded images, an image capturing circuit 128, for converting an optical image into a digital signal, a color processing circuit 130, for converting the digital signal and transmitting it to the image memory 132, a liquid crystal screen 134 making it possible to display an image stored in the Flash memory 126 or in the image memory 132, a display control circuit 136, for controlling the display of the liquid crystal screen 134 under the control of the central processing unit 120, switching means 138 (open/close switch, conversion mode switch, power switch, image selection switch, etc.) used by the user of the digital camera, an input port 140 for receiving an input signal from the switches, an interface cable 142 used to connect a host interface 144 of the camera to a corresponding digital camera interface of the host computer 146. The cable 142 may, for example, be in accordance with the USB (Universal Serial Bus) specification, and serves to transfer the images contained in memory.

The communication bus 108 affords communication between the different elements included in the apparatus 100 or elements connected to it. The representation of the bus is non-limiting and, in particular, the central processing unit may possibly communicate instructions to any element of the apparatus 100 directly or by means of another element of the apparatus 100.

According to one variant, the memory 126 may contain data that are compressed and stored, as well as the code of the invention (program "Progr") which, once read by the apparatus 100, will be stored in the memory 124.

In a second variant, the program can be received via a communication network in order to be stored in an identical fashion to that described previously.

In general terms, an information storage means, which can be read by a computer or microprocessor, integrated or not into the apparatus, and which may possibly be removable, stores a program implementing the method according to the invention In more general terms, the program can be loaded into one of the storage means of the apparatus 100 before being executed.

The central processing unit 120 will execute the instructions relating to the implementation of the invention, which are stored in the read only memory 122 or in the other storage elements. On powering up, the program or programs which are stored in a non-volatile memory, for example, the read-only memory 122, are transferred into the random access memory 124, which will then contain the executable code of the invention, as well as registers for storing the variables necessary for implementing the invention.

It should be noted that the communication apparatus capable of implementing the invention can also be a programmed apparatus.

Figure 3A:
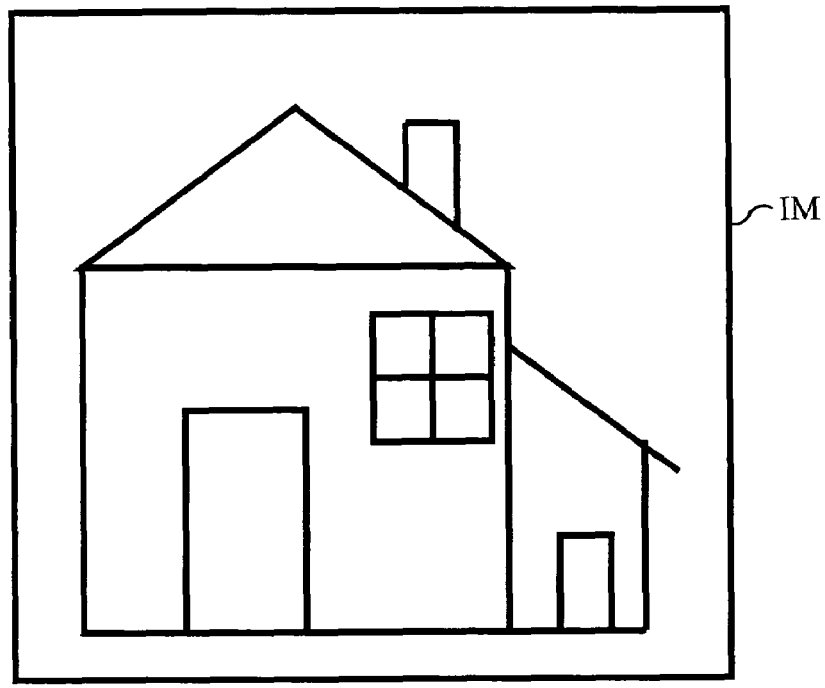
FIG. 3a is a diagram of a digital image output from the image source 1 of FIG. 1.

FIG. 3a is a diagram of a digital image IM output from the image source 1 in FIG. 1.

This figure is decomposed by the transformation circuit 21 of FIG. 1, which is a circuit for dyadic decomposition with three decomposition levels.

The circuit 21 is, in this embodiment, a conventional set of filters, respectively associated with decimators by two, which filter the image signal in two directions, into sub-band signals of high and low spatial frequencies. The relationship between a high-pass filter and a low-pass filter is often determined by the conditions for perfect reconstruction of the signal. It should be noted that the vertical and horizontal decomposition filters are not necessarily identical, although in practice this is generally the case. The circuit 21 here has three successive analysis units for decomposing the image IM into sub-band signals according to three decomposition levels.

Generally, the resolution of a signal is the number of samples per unit length used to represent that signal. In the case of an image signal, the resolution of a sub-band signal is related to the number of samples per unit length used to represent that sub-band signal horizontally and vertically. The resolution depends on the number of decompositions made, the decimation factor and the initial image resolution.

The first analysis unit receives the digital image signal IM and, in a known manner, delivers as an output four sub-band signals $LL_3$, $LH_3$, $HL_3$ and $HH_3$ with the highest resolution $R_3$ in the decomposition.

The sub-band signal $LL_3$ contains the components, or samples, of low frequency, in both directions, of the image signal. The sub-band signal $LH_3$ comprises the image signal components of low frequency in a first direction and of high frequency in a second direction. The sub-band signal $HL_3$ comprises the components of high frequency in the first direction and the components of low frequency in the second direction. Finally, the sub-band signal $HH_3$ comprises the components of high frequency in both directions.

Each sub-band signal is a set of real samples (which could also be integers) constructed from the original image, which contains information corresponding to a respectively vertical, horizontal and diagonal orientation of the content of the image, in a given frequency band. Each sub-band signal can be likened to an image.

The sub-band signal $LL_3$ is analyzed by an analysis unit similar to the previous one in order to supply four sub-band signals $LL_2$, $LH_2$, $HL_2$ and $HH_2$ of resolution level $R_2$.

Each of the sub-band signals of resolution $R_2$ also corresponds to an orientation in the image.

The sub-band signal $LL_2$ is analyzed by an analysis unit similar to the previous one in order to supply four sub-band signals $LL_0$ (by convention), $LH_1$, $HL_1$ and $HH_1$ of resolution level $R_1$. It should be noted that the sub-band $LL_0$ by itself forms the resolution $R_0$.

Each of the sub-band signals of resolution $R_1$ also corresponds to an orientation in the image.

Figure 3B:
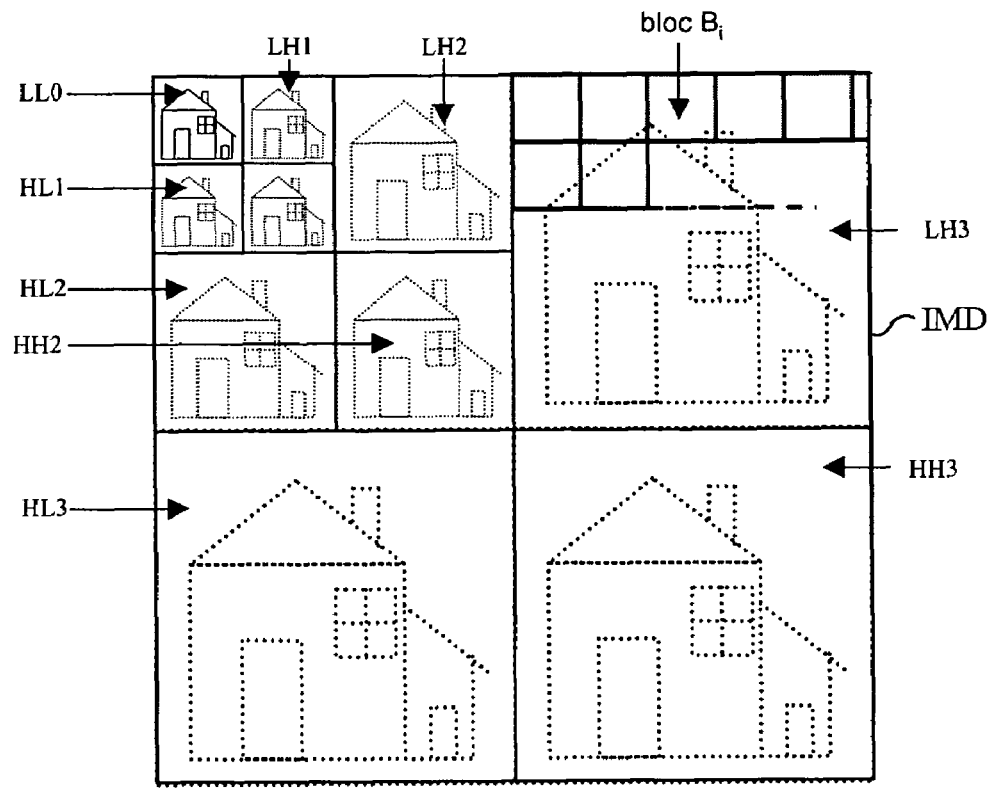
FIG. 3b is a diagram of the image of FIG. 3a after having been transformed by the circuit 21 of FIG. 1.

FIG. 3b represents the image IMD resulting from the spatio-temporal transformation applied to the image IM by the circuit 21, into ten sub-bands and at 4 resolution levels: $R_0$ ($LL_0$), $R_1$ ($LL_2$), $R_2$ ($LL_3$), $R_3$ (original image). The image IMD contains as much information as the original image IM, but the information is divided in frequency in three decomposition levels.

Naturally the number of decomposition levels and consequently of subbands can be chosen differently, for example 16 sub-bands over six resolution levels, for a bi-dimensional signal such as an image. The number of sub-bands per resolution level can also be different. In addition, it is possible for the decomposition not to be dyadic. The analysis and synthesis circuits are adapted to the dimension of the signal processed.

In FIG. 3b the samples resulting from the transformation are stored sub-band by sub-band.

It will be noted that each sub-band of the image IMD is partitioned into blocks $B_i$ some of which are shown in FIG. 3b.

The circuits 22 and 23 of FIG. 1 apply independently to each block of each sub-band considered, the device 24 applies to all the blocks. The image signal encoded by the system 2 thus conveys blocks of samples obtained by the original encoding of the samples which constitute the bitstream.

When the image signal is in accordance with the JPEG2000 standard, these blocks of samples are known as code-blocks.

The encoded image signal also has a header.

This header includes in particular the information relating to the size of the image, i.e., its width and height, its position in a coordinate system, as well as the number of resolutions Rmax.

The size of the blocks for each sub-band at a given resolution is determined by two parameters signaled by markers in the bitstream of the image signal in accordance with the JPEG2000 standard.

It will be noted that it is possible not to include in the signal the blocks corresponding to at least one resolution level such as the maximum resolution level $R_3$ or even a plurality of upper resolution levels.

The deletion of a resolution level is accompanied by a two-fold reduction in the size of the image, which is advantageous in terms of memory space freed in order, for example, to store additional signals.

Such an advantage is particularly worthwhile for an apparatus of limited memory capacity which stores digital images, such as a digital camera.

It should be noted that by keeping in the signal to be exploited only the blocks of lowest resolution level $R_0$ (low sub-band $LL_0$), it is nevertheless possible to obtain a good representation of the original image at a reduced scale.

Figure 4:
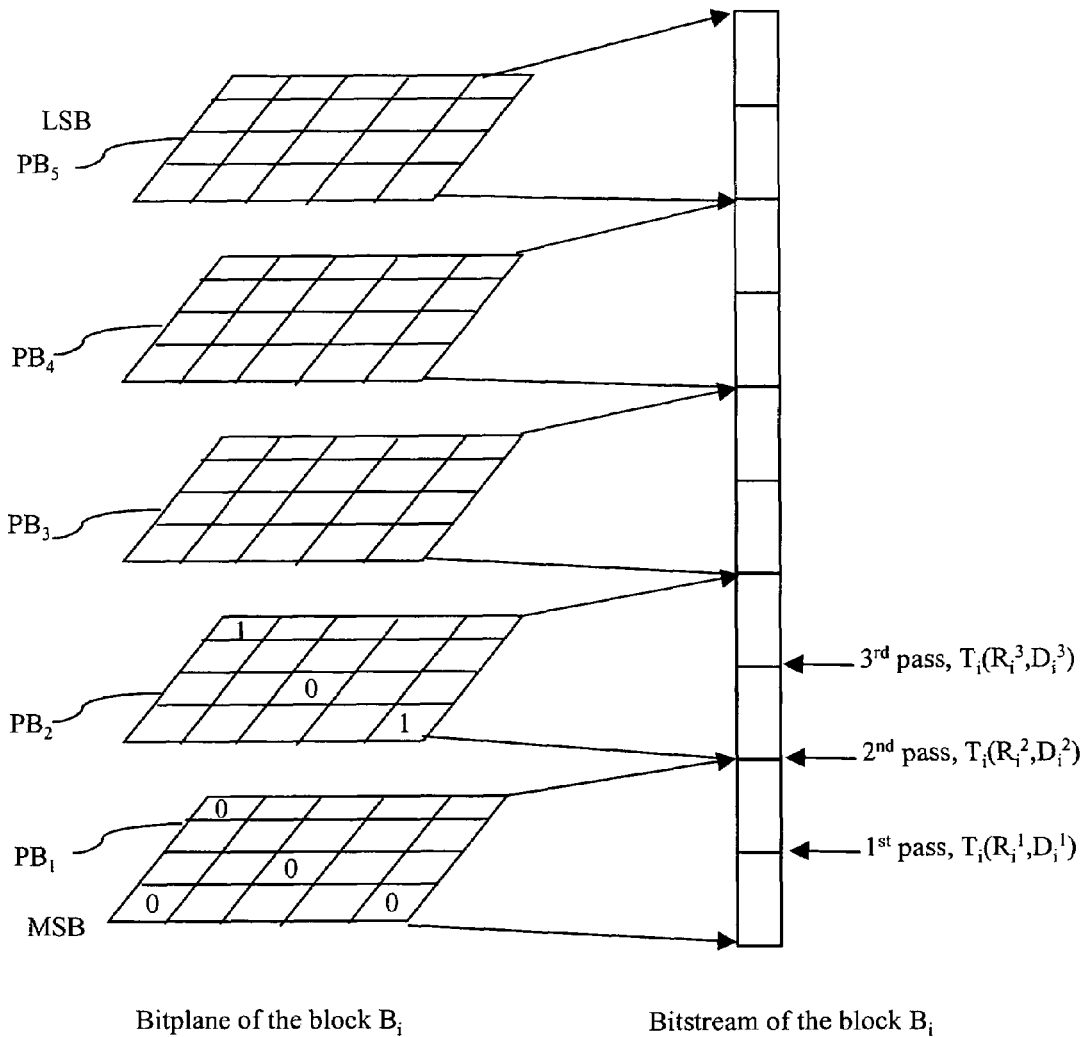
FIG. 4 is a diagram of the representation of the bitplanes of the coefficients of a data block $B_i$.

FIG. 4 illustrates the entropy encoding by bitplanes of a data block $B_i$ of an image signal. Such progressive encoding is described in the article entitled "High performance scalable image compression with EBCOT" by D. Taubman, which appeared in "IEEE Transactions on image processing", Vol. 9, No. 7, July 2000, pages 1158 to 1170.

Each coefficient of a block $B_i$ is a real number which is quantized over a plurality of bits (series of binary elements), for example five bits in FIG. 4.

The bit plane $PB_1$ contains the MSB's (Most Significant Bits) of the coefficients of the block $B_i$. The bit planes $PB_2$ to $PB_5$ contain respectively the bits that are less and less significant of the coefficients of the block $B_i$. The bit plane $PB_5$ thus contains the LSB's (Least Significant Bits) of the coefficients of the block $B_i$.

Each bit plane is encoded in a plurality of encoding passes, for example, two. The result of the first encoding pass provides a part of the encoded data for the block in question, and the result of the second pass provides another part of the encoded data comprising supplementary details.

In the final bitstream, it may be chosen to include only a part of the data (portions of binary elements) corresponding to a whole number of encoding passes: each encoding pass thus corresponds to a possible truncation point of the bitstream for the block considered. With each encoding pass there is associated a rate-distortion pair which corresponds to the supplementary rate and to the decrease in overall distortion for the reconstructed image when the corresponding data which have just been encoded following the encoding pass considered are included in the final bitstream.

The rate/distortion allocation corresponds to the selection, for each of the blocks of the image, of a truncation point of the data $T_i$ ($R_i''$, $D_i''$) of the bitstream of the block Bj, as indicated in FIG. 4.

Hierarchical quality layers or levels ("quality layers" in the JPEG2000 standard) may also be defined in the image signal. Each quality layer is defined by a whole number of supplementary encoding passes for each block of the image, this number may vary from one block to another, and thus provides supplementary details for the decoding of the image. It may, for example, be chosen to "coarsely" decode the image by taking only the encoding passes corresponding to the first quality layer. According to the invention, the quality layers will be constructed so as to correspond to the quality modes which the user can choose.

The invention will make it possible to determine, for each block, the whole number of encoding passes defining each quality layer of the signal while preserving a given visual quality.

For an image signal in "Super Fine" quality mode that may be desired to be converted into "Fine" or "Normal" mode, it is thus necessary to determine, for each block, the truncation point corresponding to "Super Fine" mode, the truncation point corresponding to "Fine" mode and the truncation point corresponding to "Normal" mode.

Figure 5A:
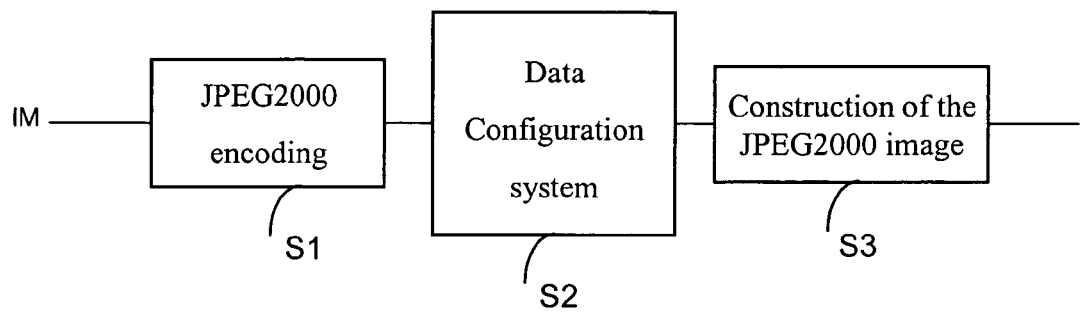
FIG. 5a is a diagram of the different steps of forming an image signal configured according to the invention.

FIG. 5a is a diagram of the different steps of forming a configured signal, for example, an image signal in accordance with the JPEG2000 standard which has three resolution levels $R_0$, $R_1$ and $R_2$.

As shown in that Figure, an original image signal IM is decomposed into frequency sub-bands in at least one resolution level during a step S1 which applies a wavelet transform to it.

During that same step, the signal in the embodiment considered, has undergone several spatio-temporal changes, in the transformations of the aforementioned type in a plurality of resolution levels, and is subjected to quantization and entropy encoding operations in order to obtain a set of encoded blocks of the image signal.

Figure 6A:
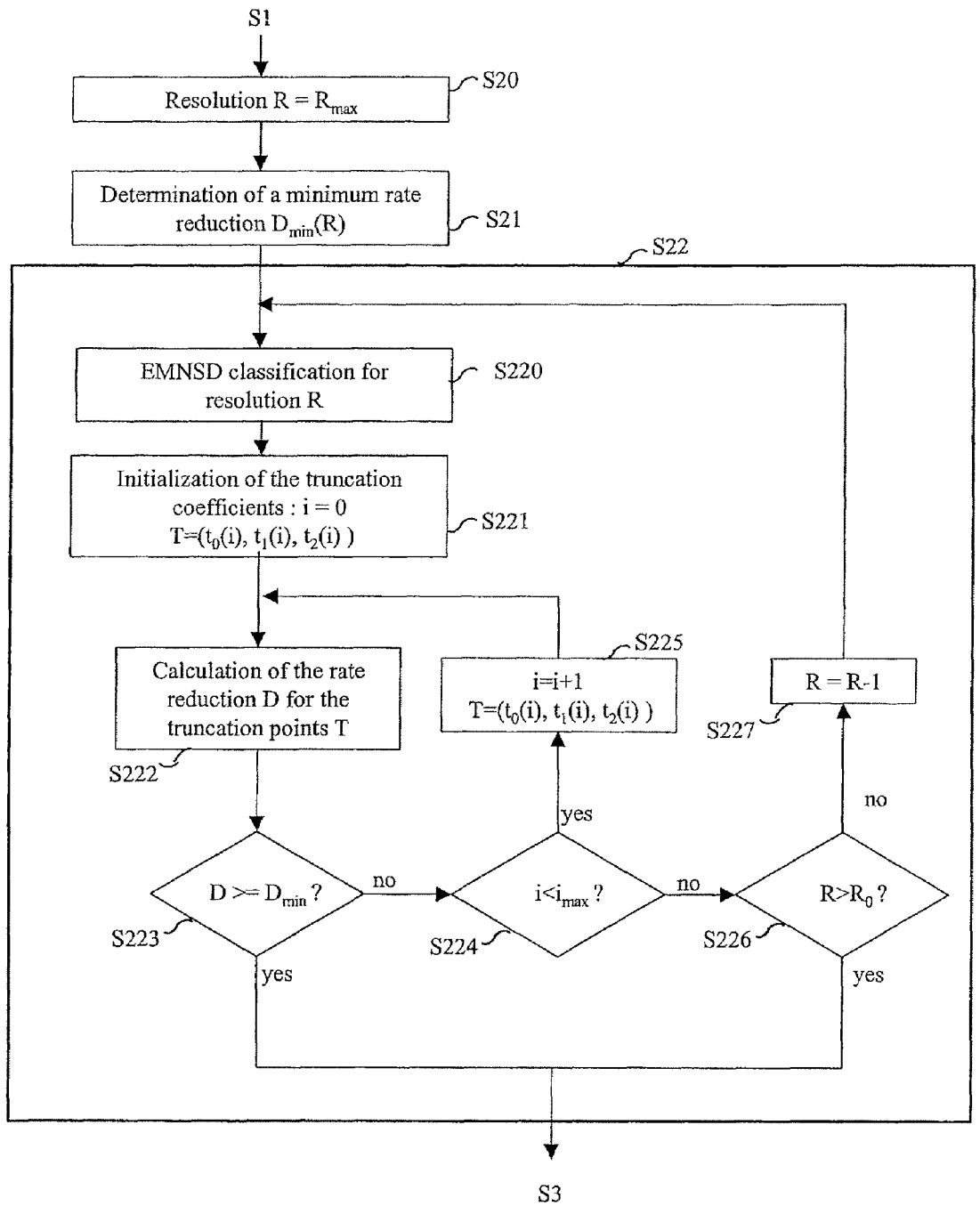
FIG. 6a is a flow chart for determining a configuration of data of a digital signal of an image according to the invention.
Figure 6B:
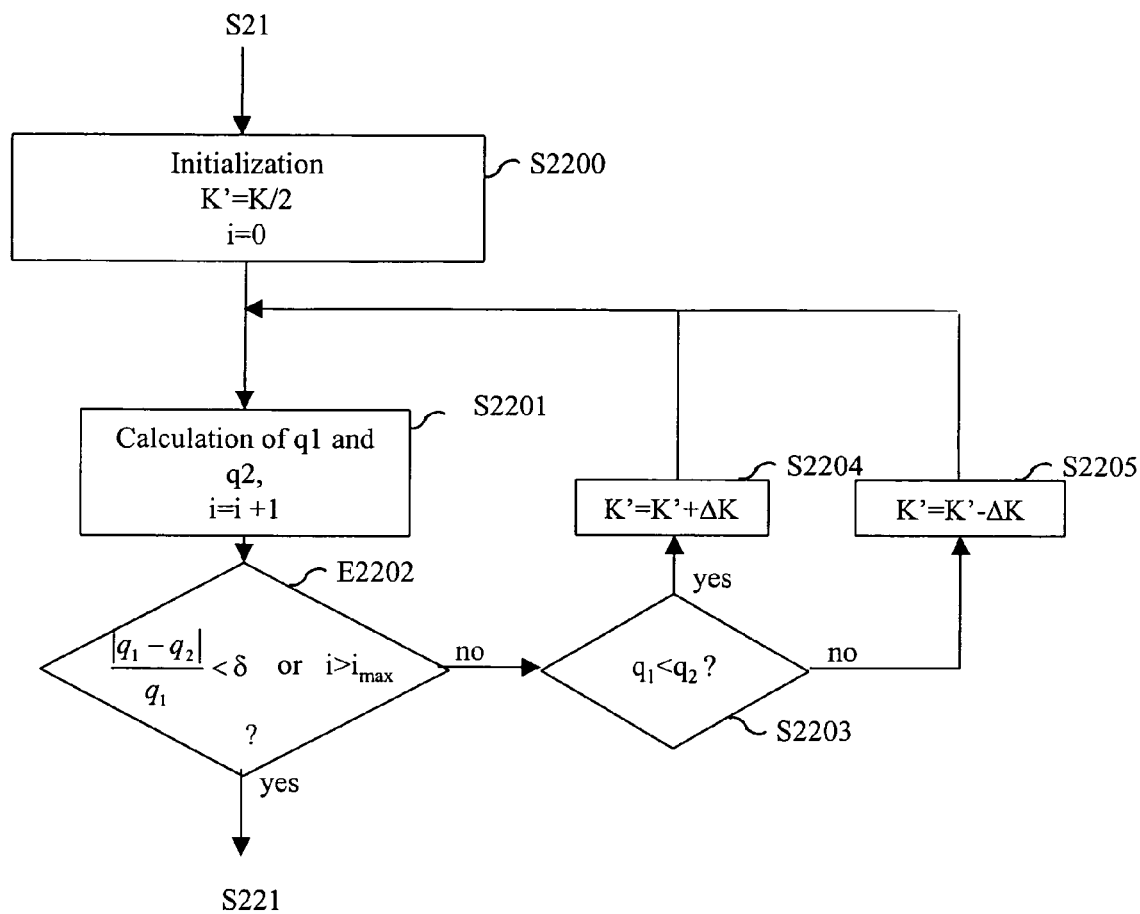

More particularly during the following step S2, the steps are implemented which are illustrated in FIGS. 6a and 6b of the system for configuring data according to the invention and described below.

During that step, provision is made, for each block of coefficients, to determine the truncation points necessary to configure or structure the final bitstream in order to obtain a set of quality modes guaranteeing a given visual quality, which will be accessible to the final user.

During the following step S3, the final bitstream is constructed of the image signal in accordance with the JPEG2000 standard.

Figure 5B:
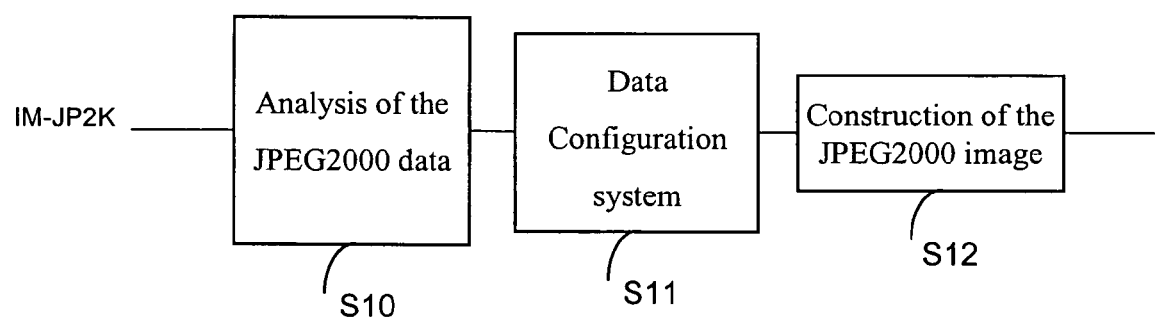
FIG. 5b is a diagram of the different steps of transcoding an image signal configured according to the invention.

FIG. 5b illustrates the steps for the transcoding of an image signal in accordance with the JPEG2000 standard according to the invention.

At the input there is an encoded image signal IM-JP2K in accordance with the JPEG2000 standard which already has a certain structure, in contrast to the unstructured image signal IM available at the input at step S1 of FIG. 5a. During the first step S10, the encoded signal is analyzed in order to obtain the encoding passes for each block of the image of each resolution level. The distortion with respect to the original image generated by deletion of encoding passes is not however known, but it is nevertheless possible to calculate the distortion generated with respect to the case in which all the encoding passes are included in the signal.

The following step S11 provides for implementing a rate/distortion allocation system such as that illustrated by the algorithms of FIGS. 6a and 6b and in which for each block the truncation points are defined which are necessary to configure the final bitstream.

Step S12 corresponds to the construction of the final bitstream and provides a JPEG2000 image signal structured differently from the starting image signal.

FIG. 6a illustrates an algorithm for determining a configuration of data of a digital signal of an image for a quality layer according to the invention. The algorithm comprises a plurality of steps or portions of software code corresponding to steps of the method according to the invention and whose execution, for example, by the central processing unit 120 of the apparatus of FIG. 2, enables the method to be implemented.

The computer program "Progr" which, as mentioned earlier, is stored, for example, in the memory 122 of the apparatus of FIG. 2, is based on that algorithm and the execution of this program enables the method according to the invention to be implemented.

Generally, the object of the algorithm of FIG. 6a is to determine a configuration of data of an image signal such that the signal in that configuration satisfies a quality mode desired by the user in terms of data rate and is of acceptable visual quality for that user.

To achieve this, provision is made to determine the truncation points of the data blocks of the image signal which define the quality layer.

The algorithm commences with a first step S20 during which the resolution level R of the image signal is initialized to the maximum resolution $R_{max}$ for the chosen display mode.

During the following step S21, provision is made for determining a minimum reduction in rate $D_{min}$ desired as a function of a quality mode desired by the user (for example the quality modes "Super Fine", "Fine" and "Normal" of the JPEG standard).

This minimum reduction in rate is judged with respect to the total rate $D_t$ of data conveyed by the entire image signal.

Later, in the description made with reference to FIG. 7, the possible relationships of conversion between the quality modes "Super Fine", "Fine" and "Normal" will be seen, and the corresponding reductions in rate.

During the following step illustrated by the reference S222, the algorithm makes provision for determining the truncation points for each data block of the image signal.

It should be noted that it is perfectly possible to deal with only certain blocks of the image.

As shown in FIG. 6a, that step divides up into the following steps S220 to S227.

During step S220, provision is made to classify the data blocks for the resolution considered according to the values of distortion which are generated by the deletion in each block of a predetermined maximum number N of encoding passes.

The number N may vary from one resolution level to another.

The number N corresponds to a maximum number of encoding passes that it is possible to delete for the data blocks in the resolution level considered and for the quality mode considered, while preserving a given visual quality that is acceptable to the user.

Thus, beyond that number, it is considered that the distortion generated by the deletion of encoding passes induces artifacts which are visible in the final image to adversely affect its visual quality.

It is hence possible to configure the data of an image signal by determining the data (encoding passes) which will later be possible to delete taking into account that given number N.

The number N is, for example, obtained by trials on different types of images which may be encountered in practice. The set of images used for those trials is sufficiently heterogeneous to represent practically all the possibilities encountered in practice, that is to say, for example, images having a high or low degree of texture, or few or many outlines. Beyond the fixed number N, even if the image viewed alone may appear acceptable, a comparison with the original image enables the artifacts to be seen.

For example, the number N may be fixed empirically at 4 for the maximum resolution level and fixed at a lower level for the other resolution levels. The number N could also be fixed after having performed tests on a set of images in order to reach a given mean value of PSNR (Peak Signal to Noise Ratio), but the resulting visual impression is then not always homogeneous.

It may also be envisaged to apply a maximum number N as a function of different characteristics of the image signal which would be identified beforehand.

In this example there would thus be a plurality of maximum numbers N as a function of the type of image encountered.

The classification of the blocks for the resolution level considered (S220) is based on the article entitled "Adaptive image coding based on the discrete wavelet transform", by Jafarkhani, Farvardin and Lee, Proceedings, Int Conf. Image Proc., vol. 3, pp 343-347, November 1994.

In that article, the classification is based on a criterion of encoding gain.

According to the invention, the classification is implemented using a different criterion which is that of the distortion generated by the deletion of a fixed number, N, of encoding passes.

The object of this classification is to obtain classes of blocks having the same statistical properties such that the distribution of the blocks into a class is consistent from the point of view of the encoding.

Consider the case of K blocks organized in terms of increasing value of their distortion $d_i$, i=1, 2, ..., K which it is desired to be distributed into two distinct classes. An integer K' is sought such that the blocks from 1 to K' belong to the first class and that the other blocks belong to the second class. The mean $m_i$ and the standard deviation $\sigma_i$ of the class i=1,2 are defined by the following relationships:

$$m_1 = \frac{1}{K'} \sum_{n=1}^{K'} d_n$$

$$m_2 = \frac{1}{K - K'} \sum_{n=K'+1}^{K} d_n$$

$$\sigma_1^2 = \frac{1}{K'} \sum_{n=1}^{K'} (d_n - m_1)^2$$

$$\sigma_2^2 = \frac{1}{K - K'} \sum_{n=K'+1}^{K} (d_n - m_2)^2$$

The integer K' is chosen such that:

$$q_1 = q_2 \quad (1)$$

$$\text{where} \quad q_i = \frac{\sigma_i}{m_i} \quad (2)$$

An iterative algorithm for finding the integer K' satisfying relationship (1) or minimizing |q$_1$−q$_2$| is described below with reference to FIG. 6b, that algorithm also forming part of the algorithm of FIG. 6a. FIG. 6b shows the details of step S220 in FIG. 6a. The symbol |x| represents the absolute value of x.

Step S2200 of FIG. 6b makes provision for initializing the iteration value i and the value K'. For example K'=K/2 may be set.

The step S2201 makes provision for calculating q$_1$ and q$_2$ by using relationship (2) and by incrementing the iteration value by one unit i=i+1.

Step S2202 is a test step during which it is determined whether $$\frac{q_1 - q_2}{q_1} < \delta$$

or whether i>i$_{max}$.

Where the result is affirmative, for either one of these cases, the classification is terminated.

Otherwise the value of K' is updated according to the result of step S2203 in the following manner:

if q$_1$<q$_2$ step S2204 is proceeded to, during the course of which the value of K' is given by the equation: K'=K'+ΔK'.

if q$_2$<q$_1$ step S2205 is proceeded to, during the course of which the value of K' is given by the equation: K'=K'−ΔK'.

The step S2201 already described above is then executed again.

For a distribution into a number of classes M>2, calculation must be made of M quotients $$q_i = \frac{\sigma_i}{m_i},$$

with i=1, 2, . . . , M.

The algorithm stops when $$\frac{\max_i q_i - \min_i q_i}{\min_i q_i} < \delta$$

max$_i$q$_i$ or when the number of iterations exceeds i$_{max}$, where max$_i$q$_i$ is the maximum value of q$_i$ and min$_i$q$_i$ is the minimum value of q$_i$ for i=1, 2, . . . , M.

At each loop the number of blocks for the classes corresponding to q$_i$ maximum and minimum are adjusted such that the values q$_i$ are as close as possible to each other.

When the algorithm of FIG. 6b has terminated and thus when the classifying step 220 of FIG. 6a has terminated, there are, for example, three classes of blocks having equivalent statistical properties in terms of standard deviation/mean ratio and reflecting the distortion generated by the deletion of a predetermined maximum number N of encoding passes.

During the following step S221, provision is made for initializing the truncation points (portions of binary elements) of the bitstream of the coefficients of each block of coefficients of the resolution level considered.

Three values of truncation points t0(i), t1(i), t2(i) are thus provided corresponding to the three classes of blocks mentioned earlier. Thus, for example, it is possible to set the following truncation point values for the maximum resolution level R2 and for the quality mode "Fine":

t0(0)=0, t1(0)=0, t2(0)=1
t0(1)=0, t1(1)=1, t2(2)=1
.
.
.
t0(i$_{max}$)=1, t1(i$_{max}$)=3, t2(i$_{max}$)=4 with i$_{max}$=6 and t(i)≦N.

The above represents the different values of truncation points for the classes of blocks considered as the loop index i of the algorithm of FIG. 6a increments.

It will be noted that when the value of the truncation point indicates 0, it means that no encoding pass has been deleted whereas, when it indicates the value 1, it means that one encoding pass has been deleted.

It will be noted that the truncation point values indicated by the reference t0(i) correspond to the data blocks classified in a first class for which the blocks generate relatively high distortion values when certain of the data constituting those blocks are not included in the bitstream.

Consequently, low truncation values are applied to those blocks, which means that few encoding passes for those blocks are deleted.

On the other hand, the truncation point values located by the reference t2(i) are allocated to blocks classified in the third class which generate the least distortion with respect to the blocks of the other classes when data constituting those blocks are deleted from them.

Due to this, for those blocks it is possible to delete more encoding passes than for the blocks belonging to the first class.

Thus, within the same resolution level, the quantity of data (number of encoding passes) to be deleted from the blocks present in that resolution level is distributed as a function of the data blocks themselves.

During step S221, determination is made of a number m of encoding passes (portions of binary elements of the coefficients of the blocks of a particular resolution level) to be deleted from the signal as a function of a given maximum number N which guarantees a given visual quality.

The number N thus corresponds to the maximum number of encoding passes which it is possible to delete without degrading the visual quality of the image.

It has been seen already how the number N can be determined.

It is remarked that the number N may vary from one class of blocks to the other and also, for the same class, from one resolution level to another.

It will be noted that the truncation point values of the bitstream of a block which were given above are determined as a function of the number N which is specific to each class of blocks.

It will thus be seen that the number N, equal to 4 for example, is only applicable for one of the classes of blocks, i.e., the blocks which generate the least distortion.

Taking into account the number of encoding passes possible to delete for each data block in the resolution considered, determination is made during the following step S222 of the reduction in rate $D_i$ generated by the deletion of the encoding passes defined beforehand at step S221.

During that same step, the reduction in rate $D_i$ is incremented for the resolution level considered by adding to it the possible reduction in rate which may have been determined for the resolution level immediately above.

In the example described, the loop performed at step S22 for the moment only concerns the resolution level $R_{max}$ (e.g., $R_2$) and thus there is no reduction in rate for a resolution level immediately above.

During the following step S223, the rate reduction, incremented if need be with the possible prior rate reduction values, is compared to the minimum rate reduction desired $D_{min}$ of step S222.

As a function of the result of the comparison, a decision is taken as to whether to reiterate at least certain of the previous steps for the current resolution level or for the level below (deletion of additional encoding passes), or whether the desired data configuration (rate, visual quality) has been determined.

Thus, if the rate reduction determined at step S222 is greater than $D_{min}$, that means that the encoding passes which have been proposed for deletion are sufficient to obtain a rate reduction that is satisfactory for the user. The guarantee of obtaining an acceptable visual quality for the user is obtained during step S221 through the choice of the maximum number of encoding passes which it is possible to delete for each class of blocks.

For the resolution levels which have not been taken into account during step S22, all the encoding passes of the blocks of those resolution levels will therefore be included in the quality layer thus created.

It will be noted that determining the number m of encoding passes to delete for a given quality layer for the resolution level considered in a way amounts to determining a number n of encoding passes to keep in the quality layer, these encoding passes defining the data of the blocks constituting a quality layer of the signal.

A configuration of the data of the digital image signal is thus determined.

The user can then select one of the quality modes of that data configuration which is present in the signal by deleting the supplementary data (encoding passes defined at step S221), that is to say by deleting a given number of quality layers.

After step S223, the following step S3 makes provision for constructing the image signal in accordance with the JPEG2000 standard as illustrated in FIG. 5a.

On the contrary, when the rate reduction (cumulated with the possible rate reductions of the higher resolutions) mentioned at step S222 is less than $D_{min}$, the rate reduction obtained is not sufficient and other encoding passes must be deleted if possible.

To do that, a test is provided at the following step S224 in order to determine whether the value of the truncation points can be increased in the resolution considered.

If i is less than $i_{max}$, the following step S225 makes provision for incrementing the loop index i by one unit and for allocating new values to the values of the truncation points $t0(i)$, $t1(i)$ and $t2(i)$ as defined earlier so as to not to exceed the maximum number N.

Step S222 already described above is then executed again to determine the rate reduction generated by the deletion of the encoding passes newly determined at step S225.

If need be, as already mentioned above, the rate reduction generated may possibly be increased by the rate reduction which may have been determined beforehand at one or more of the higher resolution levels.

The following step S223 already described above is then executed again.

When the result of the test made at step S224 is negative, it means that it is no longer possible to delete encoding passes for the resolution level considered on account of the threshold N guaranteeing a given visual quality for the signal in the resolution considered.

In that case, step S224 is followed by a step S226 which provides for carrying out another test on the value of the current resolution level in order to determine whether it is the last for the image signal considered.

If the current resolution is the last resolution, i.e., resolution $R_0$, it means that despite all the encoding passes which have been possible to delete for all the higher resolution levels, taking into account the maximum truncation values for each resolution level (number N), the rate reduction is nevertheless still less than the desired rate reduction $D_{min}$.

However, it is no longer possible in this case to delete other encoding passes if it is desired to ensure a good visual quality for the image signal.

It will, however, be noted that the trials which have been possible to perform show that in such cases (if the N values have been set as indicated above), rate reductions are nevertheless obtained which are very close to the minimum rate reduction desired.

Step S226 is then followed by step S3 which has already been described above.

When the result of the test carried out at step S226 is negative, that step is followed by a step S227 which makes provision for determining, for the loop of step S22, the truncations of the blocks of the resolution level R−1 immediately below.

Step S227 is then followed by step S220 already described above during which the data blocks of the resolution level considered are classified, for example, into three classes according to the distortion values generated.

The following steps which have already been described above are then executed again. It will thus be noted that, so long as the cumulative rate reduction remains less than the minimum rate reduction desired, and so long as it can still be contemplated to delete encoding passes in the current resolution level, or even in the resolution level hierarchically below, the execution of the algorithm continues in order to seek further encoding passes to delete.

By virtue of the presence of the threshold N which ensures the visual quality of the image signal in the resolution considered, it is not possible to delete too many encoding passes in a resolution level considered.

Thus the invention advantageously makes it possible to distribute the deletion of encoding passes in different resolution levels in order to guarantee a visual quality that is acceptable to the user.

As was seen earlier, the distribution of rate is furthermore not performed in a haphazard manner within a particular resolution level, since account is taken of the type of data block, and in particular of whether it belongs to a particular class, in order to delete a number of encoding passes adopted for the block considered.

It will be noted that the user of a digital camera has the possibility of determining the quality mode before taking his photograph. A different quantization step size (used in circuit 22 of FIG. 1) corresponds to each quality mode and the encoding passes are then all included in the final bitstream.

By virtue of the configuration of the data of the signal according to the invention, the user can also reduce the quality mode and/or resolution after having stored the photograph, and so free some memory.

There are thus a plurality of possible cases according to the original quality mode of the image signal and the quality mode desired by the user.

Figure 7:
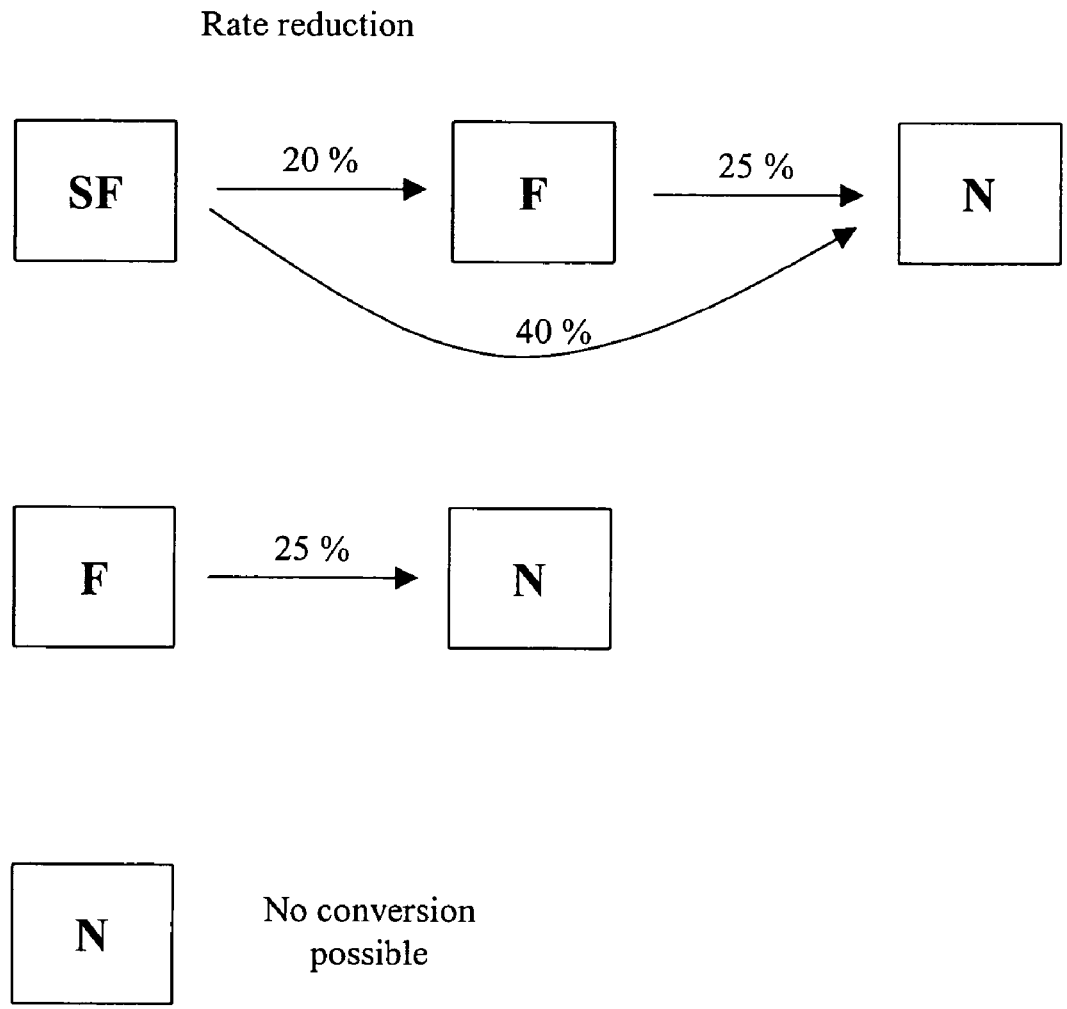
FIG. 7 is a diagram showing the possible conversions from one quality mode to another, as well as the corresponding rate reductions.

FIG. 7 summarizes the possibilities for conversion between different quality modes defined by the JPEG standard and specifies a corresponding rate reduction which can be used on implementing the invention.

In the case of an original compression in "Super Fine" mode, it is desired to convert the image into "Fine" mode or "Normal" mode. 20% and 40% of the maximum size of the image (i.e., of the image in "Super Fine" mode) can then, respectively, be taken as the rate reduction.

In the case of an original compression in "Fine" mode, it is desired to convert the image into "Normal" mode. 25% of the maximum size of the image (i.e., of the image in "Fine" mode) can then be taken as the rate reduction.

In the case of a original compression in "Normal" mode, no conversion is possible.

It should be noted that the aforementioned quality modes each corresponds to a quality layer created in the signal.

Figure 8:
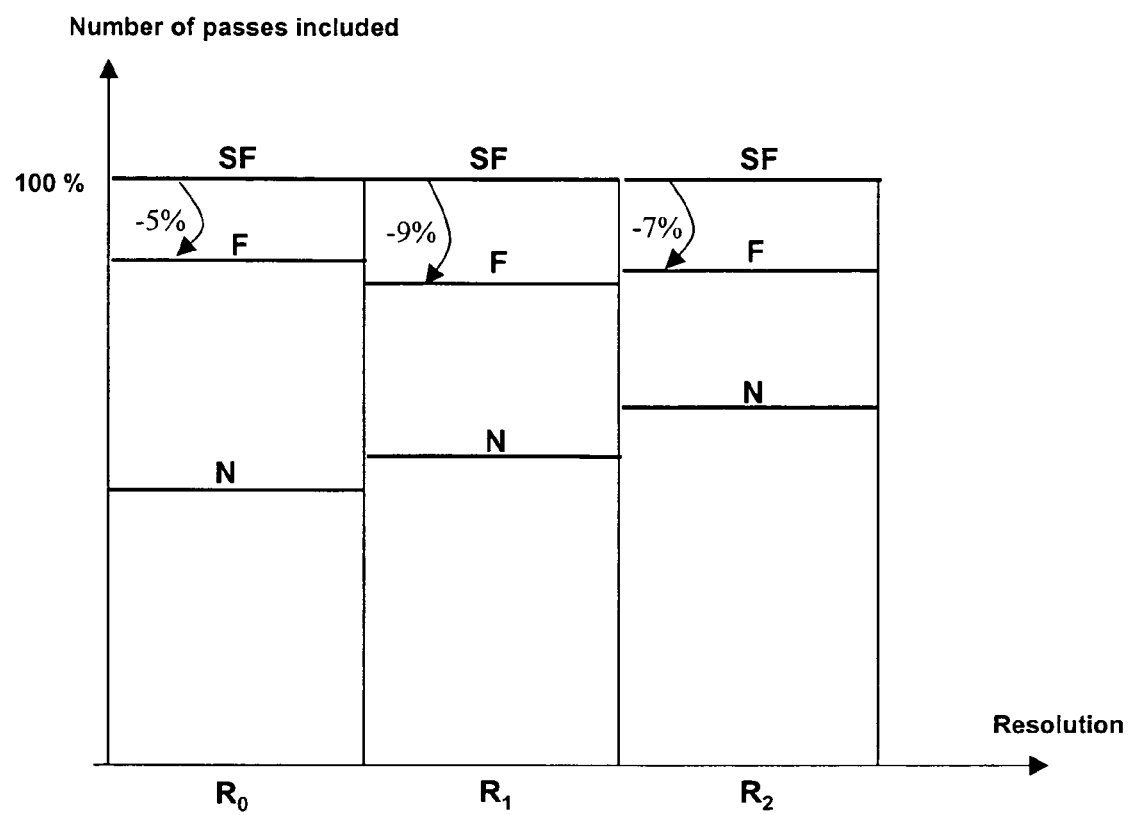
FIG. 8 is a diagram illustrating the configuration of an image signal obtained by implementation of the algorithms of FIGS. 6a and 6b.

FIG. 8 gives a simplified illustration of the configuration of the signal obtained by resolution level if the algorithm of FIG. 6a is applied several times for a JPEG2000 image signal compressed in "Super Fine" mode for the upper resolution level R2 which is desired to convert into "Fine" and "Normal" mode for that resolution.

For each resolution the encoding passes to include or not in the bitstream are represented: the encoding passes above a limit F, for example, represent the encoding passes to delete in order to obtain the "Fine" quality mode (this also defines a corresponding quality layer in the signal).

For the "Super Fine" quality mode, all the encoding passes are included in the final bitstream and thus the limits SF correspond to 100% of encoding passes included for each resolution level.

For the "Fine" quality mode, the configuration of the signal in the most complex case has been represented.

Thus the truncation points have been applied progressively for the upper resolution level R2 up to their maximum values (guaranteeing the preservation of a given visual quality), which corresponds to the loop constituted by steps S222-S223-S224-S225 of FIG. 6a.

However, as the rate reduction was insufficient (step S223), truncation points were applied to resolution R1, here too up to their maximum values, nevertheless without obtaining a sufficient rate reduction. Thus truncation points were then applied for the resolution $R_0$, which corresponds to the loop constituted by steps S226, S227, and S220 to S225 of FIG. 6a.

Thus, for example, the contribution of each resolution level to the rate reduction for resolution $R_2$ when passing from "Super Fine" mode to "Fine" mode corresponds for levels $R_2$, $R_1$ and $R_0$ respectively to 7%, 9% and 5% of encoding passes deleted with respect to the total number of encoding passes in the signal for the maximum resolution level.

For the "Normal" quality mode, the configuration of the signal in the most complex case has also been represented and the same description can thus also be used for the "Fine" mode.

In order to be able to convert an image in a quality mode, for example "Fine", to a lower quality mode, for example "Normal", it is necessary for all the encoding passes of the "Normal" mode to be also included in the "Fine" mode. In FIG. 8 this results in the fact that the limits for the "Normal" mode must be below the limits for the "Fine" mode whatever the resolution considered.

Thus, in step S221 of FIG. 6a, for a given quality, the value of the truncation points applied for the quality above, i.e., the number of encoding passes rejected for the quality mode above, must be set as the initial value for the truncation points, that is to say as the minimum number of encoding passes rejected.

Figure 9A:
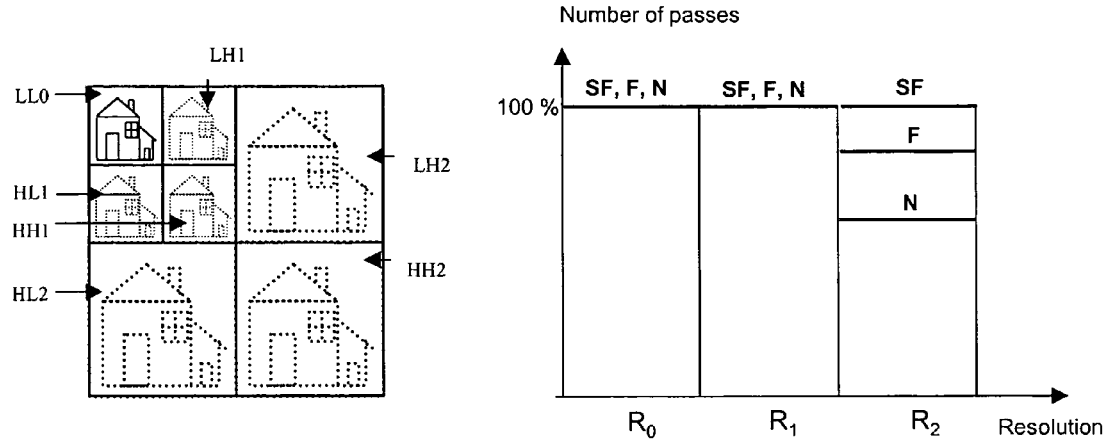
FIGS. 9a and 9b are diagrams illustrating the deletion of a resolution level in an image signal configured by the algorithm of FIGS. 6a and 6b.
Figure 9B:
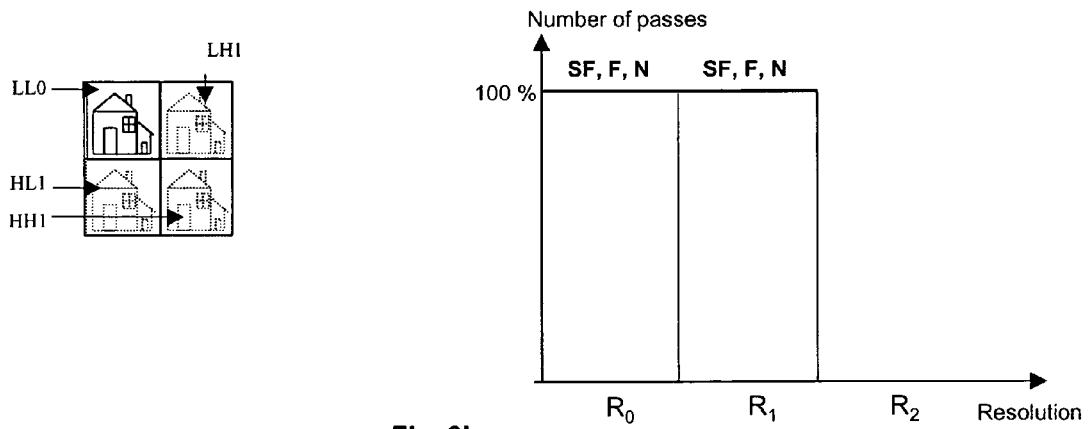

FIGS. 9a and 9b represent a particular configuration of a JPEG2000 image signal which can be obtained by the algorithm of FIGS. 6a and 6b and illustrates the problem of the conversion from one quality mode to another when it is also desired to reduce the size of the image by deleting a resolution.

In the view on the left, FIG. 9a represents the projection of an image into the different frequency sub-bands after having applied a wavelet transform to the image, and, in the view on the right, represents the configuration which can be obtained on implementing the invention.

It is assumed here that the image has large wavelet coefficients in the upper resolution $R_2$ and that the truncation points applied in that resolution are sufficient to obtain a satisfactory rate reduction for the "Fine" and "Normal" quality modes. Two quality layers (F and N) are thus created for the maximum resolution $R_2$. For the lower resolutions all the blocks will thus be included, whatever the quality mode ("Super Fine", "Fine" and "Normal").

FIG. 9b repeats the views of FIG. 9a when the upper resolution is deleted, that is to say when the user changes the size of the image, for example, to free up memory space and take additional photographs. The quality modes, as they have been defined, are then no longer accessible for resolution $R_1$: it is not possible for the user to reduce the quality of the image if he desires to gain further memory space.

This particular case is an extreme case in which the conversion is not possible in the lower resolutions.

This is because, in the more general case illustrated in FIG. 8, the rate reduction is determined on the basis of the total data rate of the image in the upper resolution level and, consequently, it is not known what rate reduction would be obtained on passing from an image in "Super Fine" mode in resolution $R_1$ to an image in "Fine" mode in resolution $R_1$.

The configuration presented in FIG. 8 thus remains valid only if the image is kept at full resolution.

If, on the contrary, it is desired to enable the resolution of the image to be reduced while keeping each quality mode, rate/visual quality allocation system illustrated in FIGS. 6a and 6b must be applied to determine the appropriate rate reduction for each possible display resolution $R_a$.

Figure 10:
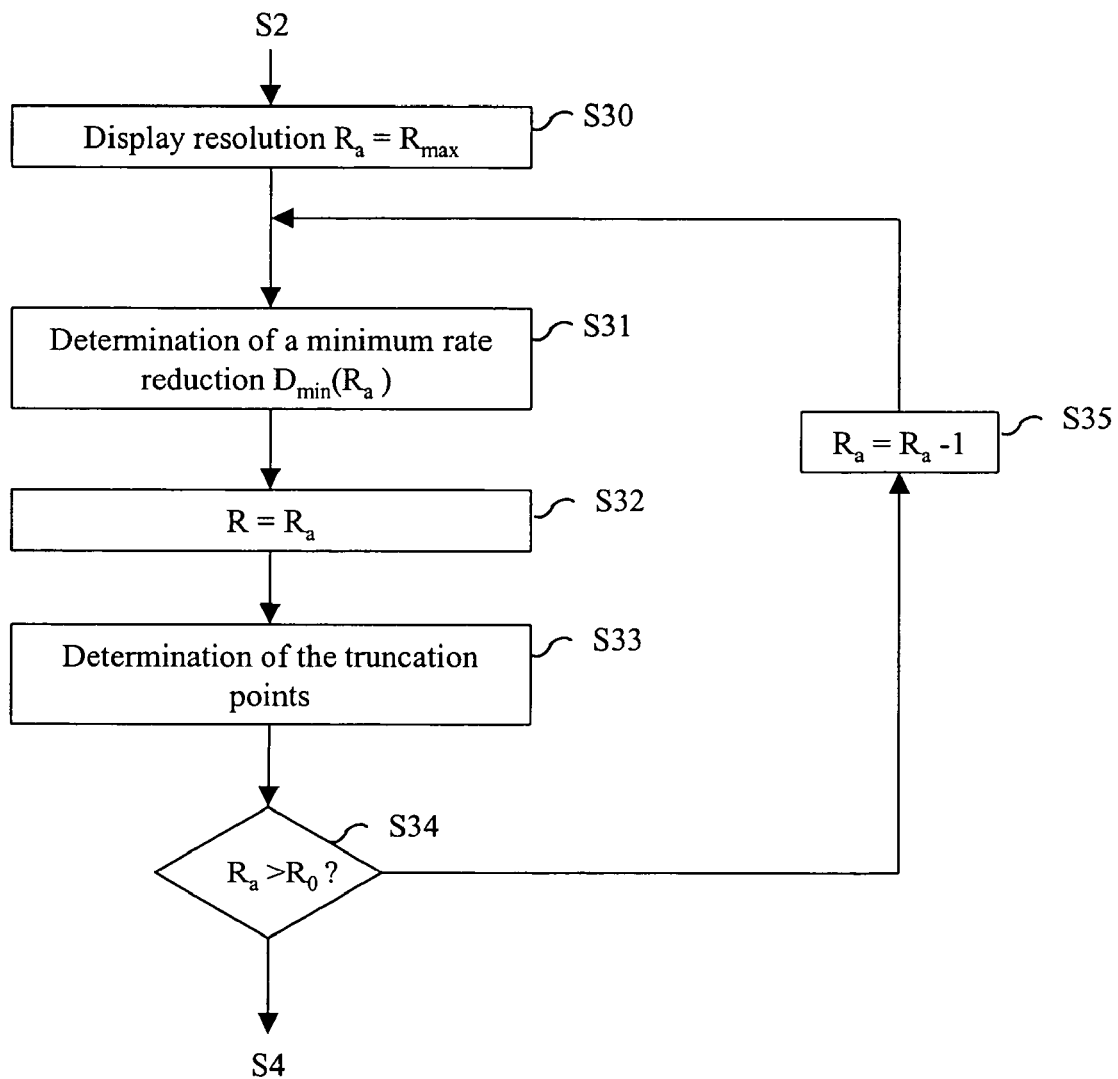
FIG. 10 is a flow chart illustrating configuring data of an image signal according to a variant form of the invention.

FIG. 10 repeats the algorithm of FIG. 6a by performing a loop on the display resolution $R_a$ in order to allow the conversion from a given quality mode to a lower quality mode whatever the resolution chosen.

It will be noted that to decode an image at a display resolution $R_a$ all the resolution levels less than or equal to $R_a$ are needed.

Thus a minimum rate reduction is determined for each resolution level considered and the data of the signal will be configured for each resolution level in one or more quality layers.

A first step S30 initializes the display resolution by setting $R_a$ to the maximum resolution $R_{max}$ of the image.

During the following step S31, the minimum desired rate reduction $D_{min}(R_a)$ is determined as a function of the quality mode Q desired by the user and of the total data rate $D_t$ obtained when all the encoding passes of the image are included in the bitstream for the display resolution $R_a$ considered.

The following step S32 initializes the resolution R to the display resolution $R_a$.

The following step S33 determines the truncation points for each block of the image for the resolution R considered. That step is identical to step S22 of FIGS. 6a and 6b and will thus not be given here.

During that step, the rate reduction determined for the current resolution is compared to $D_{min}(R_a)$ and, as a function of the result of the comparison, it is decided either that the preceding steps must be repeated for that resolution (deletion of a greater number of encoding passes for that resolution), or that it is necessary to delete encoding passes in the lower resolution levels for that quality layer and that rate reduction, or that it is necessary to reiterate steps S31 and S32 for the lower resolution levels, or that the desired configuration (all quality layers) has been obtained for that resolution.

Step S34 is a test during which it is determined whether the display resolution $R_a$ is the last resolution to process.

According to the case envisaged, the last resolution to process may be the last resolution of the signal or a predetermined resolution beyond which it is not desired to go.

If it is the last resolution, step S4 is entered in order to construct the final bitstream.

Otherwise, step S35 is proceeded to which provides for applying the algorithm to the display resolution $R_a=R_a-1$. After that step, step S31 is looped back to in order to determine the rate reduction necessary for that new display resolution as already described above.

That algorithm enables the user to delete a resolution (for example $R_2$) as in FIG. 9 and furthermore to have access, in the remaining lower resolutions, to one or more different quality modes (quality layers created).

Figure 11:
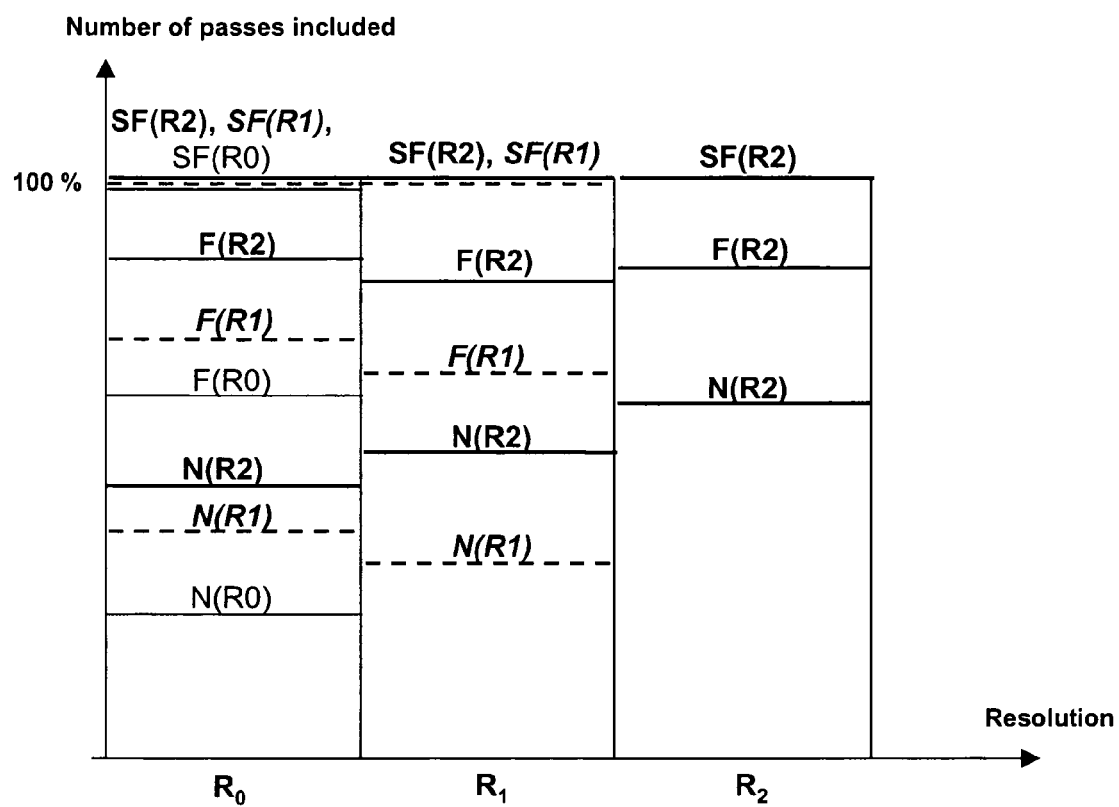
FIG. 11 is a diagram illustrating a configuration of an image signal obtained through applying the algorithm of FIG. 10.

FIG. 11 illustrates a configuration obtained by applying the algorithm of FIG. 10, for an original JPEG2000 image signal compressed in "Super Fine" quality mode, in full resolution $R_2$, and which it is desired to convert into "Fine" and "Normal" mode, whatever the chosen resolution.

For each resolution, the encoding passes to include or not to include in the bitstream are represented. The truncation points for obtaining the "Fine" and "Normal" modes at full resolution are indicated in thick lines. The truncation points for obtaining the "Fine" and "Normal" modes at resolution $R_1$ are indicated in dashed lines and in italic. The truncation points for obtaining the "Fine" and "Normal" modes at resolution Ro are indicated in fine lines.

For the "Super Fine" quality mode, all the encoding passes are included in the final bitstream (upper quality layer) and thus the limits SF correspond to 100% of encoding passes included for each resolution level. For the other modes, the general case applies, that is to obtain a desired rate reduction, the truncation points (quality layer(s) hierarchically below) are applied in the display resolutions and in the resolutions below.

As already mentioned above in the description for FIG. 8, in order to be able to convert an image in a quality mode, for example "Fine", to a lower quality mode, for example "Normal", while preserving the same display resolution, it is necessary for all the encoding passes of the "Normal" mode to be also present in the "Fine" mode. The result of this in FIG. 11 is that the limits corresponding to "Normal" mode (for example, $N(R_2)$) in each resolution level must be situated below the limits for "Fine" mode (for example, $F(R_2)$) in each resolution level whatever the resolution considered.

Similarly, it is desired to be able to delete a resolution while preserving a given quality.

If one wishes, for example, to pass from "Fine" mode at full resolution ($F(R_2)$) to "Fine" mode at lower resolution ($F(R_1)$), it is necessary for the encoding passes of the "Fine" mode of the lower resolution to be present in the "Fine" mode at full resolution. In FIG. 11, this results in the fact that for a given quality mode, the limits corresponding to the higher display resolutions $F(R_2)$ are situated above the limits corresponding to the lower display resolutions ($F(R_1)$, $F(R_0)$).

It should be noted that at step S221 of FIG. 6a, for a given display resolution and quality mode, the initial value of the truncation points must be fixed as:

the value of the truncation points applied for the quality mode above if the display resolution processed is full resolution, otherwise, the maximum value between:

the value of the truncation points of the same quality mode but for a higher display resolution.

the value of the truncation points of the quality mode above but for the same display resolution.

Figure 12:
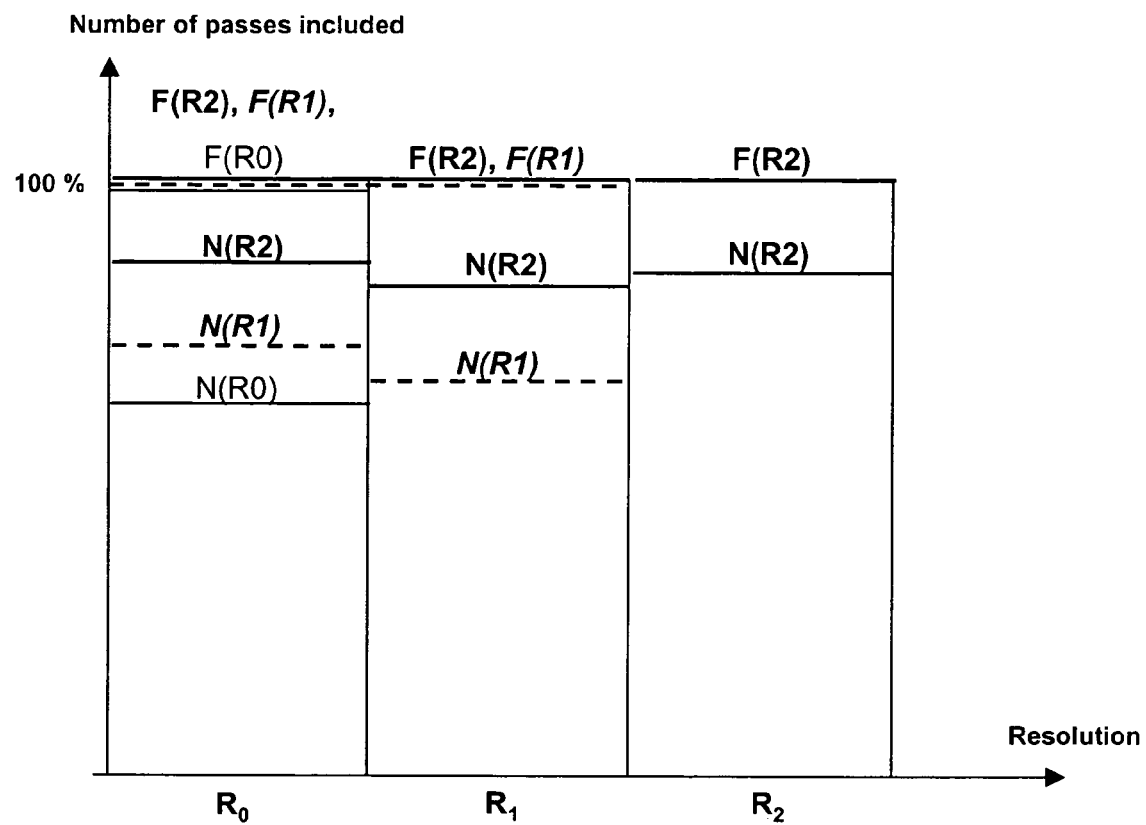
FIG. 12 is a diagram illustrating another configuration of the data of an image signal obtained through applying the algorithm of FIG. 10.

FIG. 12 illustrates a configuration obtained by applying the algorithm of FIG. 10, for an original JPEG2000 image signal compressed in "Fine" quality mode, in full resolution R2, which is desired to be converted into "Normal" mode, whatever the chosen resolution.

The truncation points for obtaining the "Normal" mode at full resolution ($N(R_2)$) are indicated in thick lines. The truncation points for obtaining the "Normal" mode at resolution $R_1$ ($N(R_1)$) are indicated in dashed lines and in italic. The truncation points for obtaining the "Normal" mode at resolution $R_0$ ($N(R_0)$) are indicated in fine lines.

For the "Fine" quality mode (highest quality layer), all the encoding passes are included in the final bitstream and the limits F thus correspond to 100% of encoding passes included, for each resolution level.

As for FIG. 11, for the other quality modes, the general case applies, that is to say that to obtain a desired rate reduction, the truncation points (quality layer(s) hierarchically below) are applied in the display resolutions and in the resolutions below.

Figure 13A:
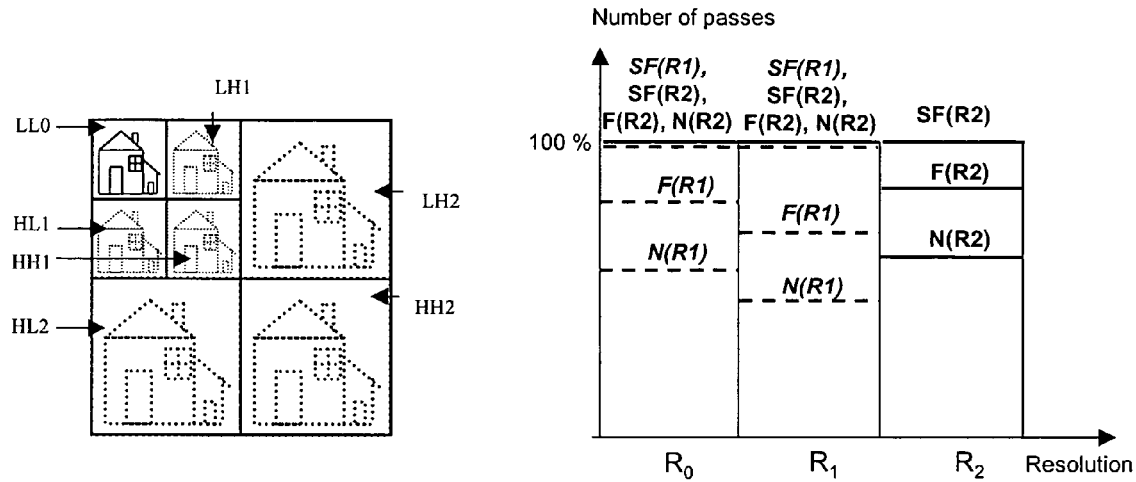
FIGS. 13a and 13b are diagrams illustrating the deletion of a resolution level in an image signal configured by the algorithm of FIG. 10.
Figure 13B:
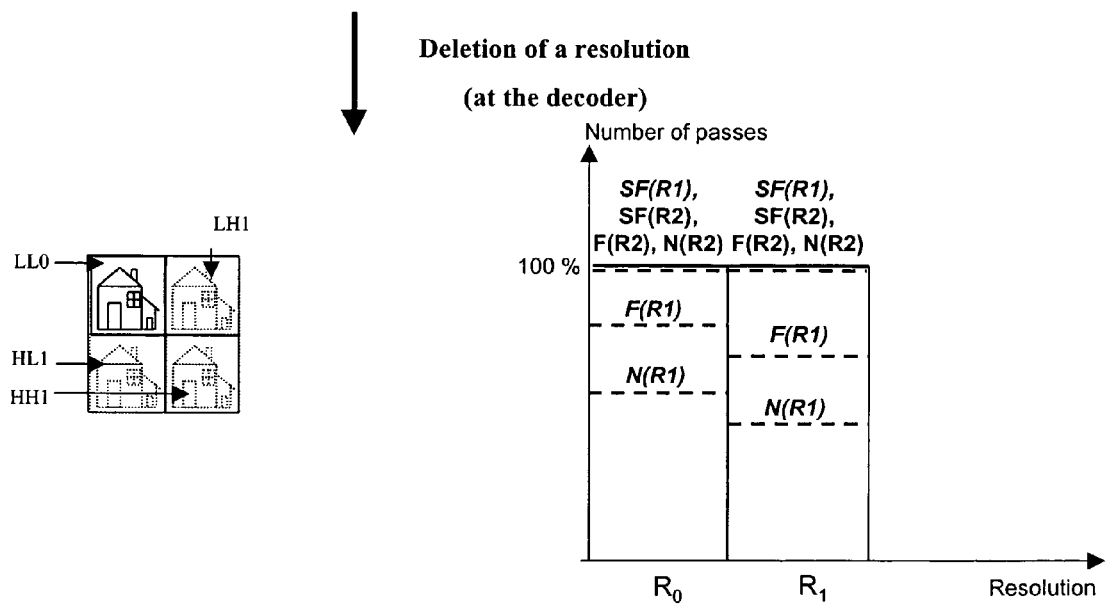

FIGS. 13a and 13b repeat the example illustrated in FIGS. 9a and 9b (deletion of a resolution level), but with the algorithm of FIG. 10. These Figures show the possibility of converting a signal from one quality mode to a lower quality mode whatever the display resolution chosen.

In the view on the left, FIG. 13a represents the projection of an image into the different frequency sub-bands after having applied a wavelet transform to the image, and, in the view on the right, represents the configuration which can be obtained on applying the algorithm of FIG. 10.

It is assumed here that the image has high wavelet coefficients in the highest resolution $R_2$ and that truncation points applied in that resolution are sufficient to obtain a satisfactory rate reduction for the "Fine" and "Normal" quality modes and a display at full resolution (two quality layers $F(R_2)$ and $N(R_2)$) are thus created in a single resolution level).

For the lower resolutions all the blocks will thus be included, whatever the quality mode.

For a display at resolution $R_a=R_1$, the truncation points are represented in dashed lines.

It is assumed here that the general case applies, that is to say that truncation points must be applied in the resolutions $R_1$ and $R_0$ to obtain the quality modes "Fine" and "Normal".

FIG. 13b repeats the views of FIG. 13a when the upper resolution is deleted, that is to say when the user changes the size of the image, for example, to free up memory space and take additional photographs.

In that image of reduced size, it is also possible to convert the image into "Fine" mode $F(R_1)$ by applying the corresponding truncation points to a display at resolution $R_1$.

In the description made with reference to FIGS. 8 and 11, the relationships between the different quality modes for a given display resolution ("Super Fine" quality mode above "Fine", itself above "Normal") and, for the same quality mode, the relationships between the different display resolutions (highest display resolution above the lower display resolutions for a given quality) are described.

Nevertheless, several other ways of organizing the bitstream can also be envisaged.

Figure 14A:
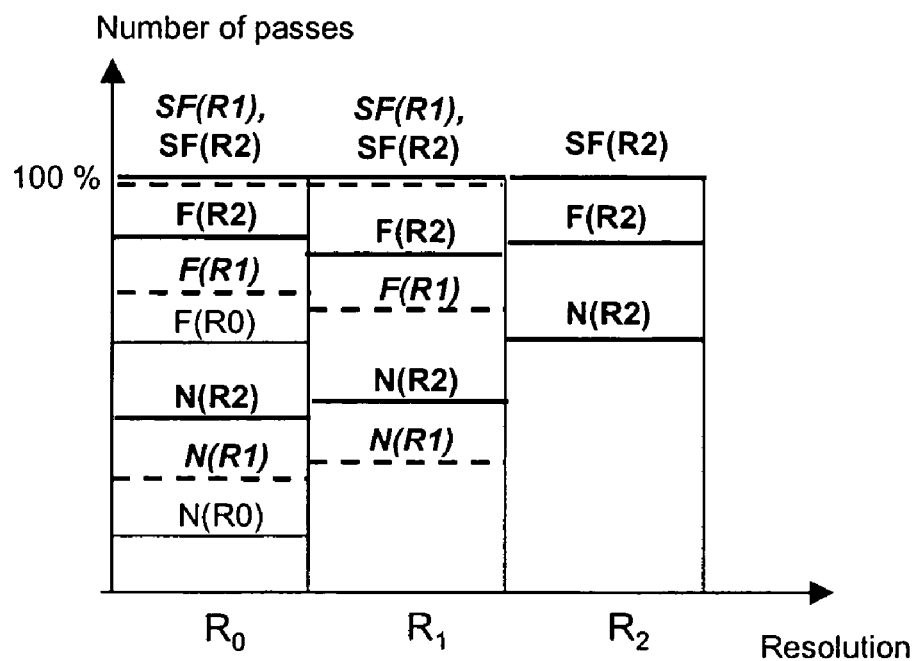
FIGS. 14a and 14b are diagrams respectively illustrating two possible configurations of an image signal by implementation of the invention.
Figure 14B:
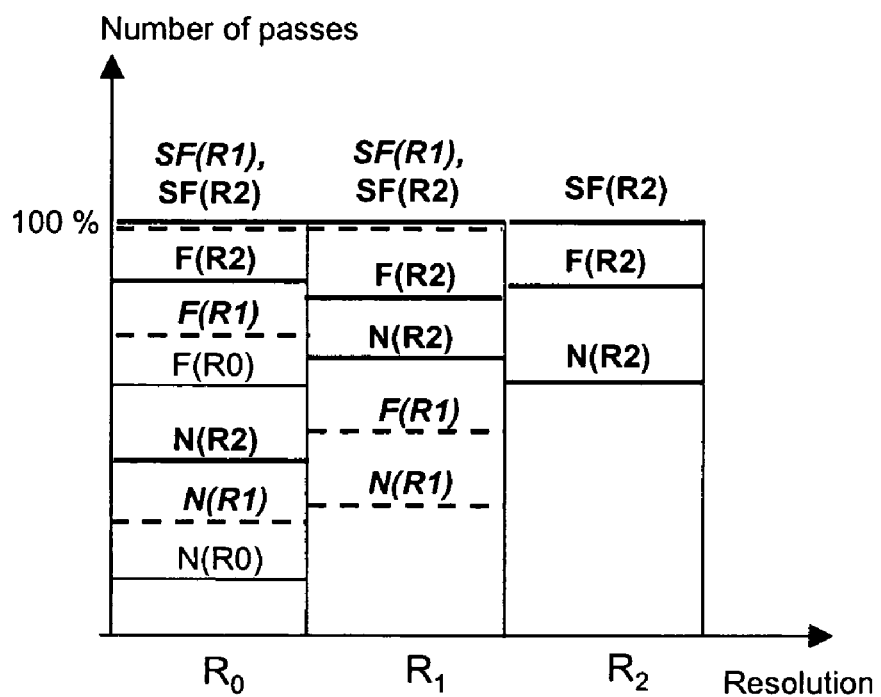

FIGS. 14a and 14b thus represent two possible configurations for resolution $R_1$.

To be able to simply convert an image to the desired quality mode and resolution, additional data must be added on the order of the quality modes. These data may be included in the compressed JPEG2000 file, for example, in the segments corresponding to the markers denoted COM (for comment), for each different tile of the image signal.

The order of the quality layers is thus added. It should be noted that the "Super Fine" modes are not specified since, in all cases, they include all the blocks of the desired resolution. For example for FIG. 14a, the information will be of the type: [N0, N1, N2, F0, F1, F2].

This is because in the case of FIG. 14a the quality modes correspond to quality layers within the meaning of the JPEG2000 standard, that is to say that each quality mode corresponds to additional data in one or more resolutions. There are thus the following quality layers:

N(R0) adds information in $R_0$,
N(R1) adds information in $R_0$ and $R_1$,
N(R2) adds information in $R_0$, $R_1$ and $R_2$,
F(R0) adds information in R0,
F(R1) adds information in $R_0$ and $R_1$,
F(R2) adds information in $R_0$, $R_1$ and $R_2$,
SF(R2) adds information in $R_0$, $R_1$ and $R_2$, This organization is possible since the same ordering of the quality modes is present in each resolution.

In contrast, in the case of FIG. 14b, the ordering is different in resolution $R_0$ and in resolution $R_1$: thus in $R_0$ we have $F(R_1)$ above $N(R_2)$ and in $R_1$ we have $N(R_2)$ above $F(R_1)$.

It is thus not possible to define the quality modes in terms of progressive layers, since that would then give:

N($R_0$) adds information in $R_0$,
N($R_1$) adds information in $R_0$ and $R_1$,
N($R_2$) adds information in $R_0$, $R_1$ and $R_2$,
F($R_0$) adds information in $R_0$,
F($R_1$) adds information in $R_0$ and information in $R_1$ is deleted.

This situation is not compatible with the quality layer definition of the JPEG2000 standard where each layer must include information. Quality layers are thus defined for each resolution, which, in the example considered, gives 15 layers (7 layers for resolution $R_0$, 5 for $R_1$ and 3 for $R_2$) and the additional information contained in the segments corresponding to the marker COM enable determination of which layers must be included in order to reconstruct a new JPEG2000 file at a given quality and level.

In this way, information is added to the signal to establish a correspondence between the quality layers and the quality modes since, in fact, when the quality layers of the compressed signal are decoded, it is not known what they correspond to. Nevertheless, no additional calculation will be necessary.

Thus a decodable image signal is preserved whatever the decoder.

It will be noted that, generally, the configuration of data of a digital signal according to the invention can also be implemented on transcoding that signal.

The invention claimed is:

1. A method of determining a data configuration of a digital signal of an image, the signal having undergone at least one spatio-frequential transformation in a plurality of resolution levels, characterized in that the method comprises the following steps:

determining at least two minimum rate reductions ($D_{min}$) as proportions of the total data rate of at least one resolution level of the signal, each as a function of a quality mode desired for the signal, distributing, over several of the plurality of the resolution levels of the signal, a rate reduction (D) greater than or equal to one of the minimum rate reductions ($D_{min}$) and which is such that the reduction in data rate distributed in each resolution level is less than or equal to a threshold representing a given quality mode, adding at least one marker describing the distribution of the reduction in data rate; and wherein the determining, the distributing and the adding steps are performed using a computer.

2. A method according to claim 1, wherein, in a given resolution level:

there are several quality layers, each corresponding to a quality mode for a resolution level that is higher than or equal to the given resolution level, the quality mode for the higher resolution level is greater than the quality mode for the given resolution level, the given resolution level is different from the highest resolution level.

3. A method according to claim 2, characterized in that the signal issuing from said at least one spatio-frequential transformation comprises blocks each containing at least one transformed coefficient having the form of a series of binary elements, the data making up a quality layer which is defined in at least one resolution level of the signal, corresponding, for at least one block of a given resolution level, to at least a number n of portions of binary elements of said at least one block.

4. A method according to claim 3, characterized in that said at least one number n of portions of binary elements is determined as a function of a given number N which corresponds to the maximum number of portions of binary elements which it is possible to delete in a block to obtain a given quality mode in the resolution considered.

5. A method according to claim 4, characterized in that the method comprises a step of classifying the blocks as a function of the values of the distortion which is generated for each block when a given number of portions of binary elements is deleted from each block.

6. A method according to claim 5, characterized in that the blocks are classified into different classes of blocks to each of which belong the blocks having given rise to values of distortion which are consistent with each other.

7. A method according to claim 5 or 6, characterized in that the maximum number N of portions of binary elements which it is possible to delete from a block depends on the classification of that block.

8. A method according to claim 1, characterized in that the signal having undergone said at least one spatio-frequential transformation comprises transformed coefficients grouped into blocks in which each coefficient is quantized over a plurality of bits, each bitplane of a block being encoded by a plurality of encoding passes which each provides a portion of the encoding data for the block considered, wherein said distributing step comprises obtaining, in at least one resolution level of the signal and for each of the blocks considered, a minimum number m of encoding passes corresponding to the given quality mode.

9. A method according to claim 8, characterized in that the number m is obtained as a function of a maximum given number N of encoding passes which it is possible to delete for the coefficients of a data block in order to obtain a given quality mode in the resolution considered.

10. A method according to claim 1, wherein the steps of determining and distributing are performed for each resolution level.

11. A device for determining a data configuration of a digital signal of an image, the signal having undergone at least one spatio-frequential transformation in a plurality of resolution levels, characterized in that the device comprises:

means for determining at least two minimum rate reductions ($D_{min}$) as proportions of the total rate of data of at least one resolution level of the signal, each as a function of a quality mode desired for the signal, means for distributing, over several of the plurality of the resolution levels of the signal, a rate reduction (D) greater than or equal to one of the minimum rate reductions ($D_{min}$) and which is such that the reduction in data rate distributed in each resolution level is less than or equal to a threshold representing a given quality mode, and means for adding at least one marker describing the distribution of the reduction in data rate.

12. A digital camera comprising a device according to claim 11.

13. An information storage means which can be read by a computer or a microprocessor containing code instructions of a computer program for executing the steps of the method according to claim 1.

14. A partially or totally removable information storage means which can be read by a computer or a microprocessor containing code instructions of a computer program for executing the steps of the method according to claim 1.

* * * * *